United States Patent [19]
Wyrwas et al.

[11] Patent Number: 6,072,430
[45] Date of Patent: Jun. 6, 2000

[54] SATELLITE TERMINAL POSITION DETERMINATION

[75] Inventors: Richard Wyrwas; Dennis Roy Mullins, both of London, United Kingdom

[73] Assignee: ICO Services Ltd., London, United Kingdom

[21] Appl. No.: 09/055,294

[22] Filed: Apr. 6, 1998

[30] Foreign Application Priority Data

Apr. 9, 1997 [GB] United Kingdom .................... 9707213

[51] Int. Cl.⁷ .............................. G01S 5/02; H04B 7/185
[52] U.S. Cl. ................................ 342/357.1; 342/357.01; 342/357.06; 342/357.15; 701/213
[58] Field of Search ......................... 342/357.01, 357.06, 342/357.15, 357.1, 352; 701/213

[56] References Cited

U.S. PATENT DOCUMENTS

| | | |
|---|---|---|
| 5,043,736 | 8/1991 | Darnell et al. . |
| 5,311,194 | 5/1994 | Brown ..................................... 342/357 |
| 5,491,636 | 2/1996 | Robertson et al. ...................... 364/432 |
| 5,589,836 | 12/1996 | Noetzel ............................... 342/357.15 |
| 5,844,521 | 12/1998 | Stephens et al. ..................... 342/357.1 |

FOREIGN PATENT DOCUMENTS

| | | |
|---|---|---|
| 0 467 651 A1 | 1/1992 | European Pat. Off. . |
| 44 24 412 A1 | 1/1996 | Germany . |
| 2 279 842 | 1/1995 | United Kingdom . |
| 94/15412 | 7/1994 | WIPO . |
| WO94/28434 | 12/1994 | WIPO . |

*Primary Examiner*—Thomas H. Tarcza
*Assistant Examiner*—Dao L. Phan
*Attorney, Agent, or Firm*—McDermott, Will & Emery

[57] ABSTRACT

A terminal 44 44A 44B using standard navigational satellite 142 position determination to find its position on the surface of the earth 14, has its performance enhanced by being linked to a communications satellite system 10 38. In one variant, the communications satellite 10 broadcasts on each of a plurality of spot beams 30, each interactive with a different part of the earth, the broadcast indicating which navigational satellites 142 are accessible for a terminal within that beam 30. The terminal 44 44A 44B receives the broadcast and adjusts the navigational satellite receiver 174 to look for signals only from the nominated navigational satellites 142. In another variant, the communications satellite system 10 38 approximately measures the position of the terminal 44 44B and then informs the terminal 44 44B which navigational satellites are accessible from the terminal 44 44B, the navigational satellite receiver 174 again only looking for signals from the nominated navigational satellites 142. In both variants, the time required to establish a position is reduced by the navigational satellite receiver 174 not being required to listen for inappropriate or inaccessible navigational satellites 142.

36 Claims, 23 Drawing Sheets

SATELLITE TERMINAL POSITION DETERMINATION

FIELD OF THE INVENTION

The present invention relates to position measuring systems and methods where a terminal, on the surface of the earth, receives signals from a plurality of navigational satellites which can be used accurately, to measure the position of the terminal.

BACKGROUND OF THE INVENTION

There are several systems, in use, where a terminal can receive signals from orbiting navigational satellites whereby the position of the terminal, on the surface of the earth, can be measured with accuracy extending down to a few meters. One such system is the NAVSTAR™ GPS (Global Positioning by Satellite) system. A terminal will receive signals from any navigational satellites which it can hear. The navigational satellites broadcast to all terminals in their vicinity. Messages pass only from the navigational satellite to the terminal. The satellite transmits its identity, the exact time at which the broadcast was sent, and copious details concerning the orbit of the navigational satellite. The terminal notes the time that the data was received from the navigational satellite and stores the identity and details of the orbit. The terminal resolves its own clock inaccuracies by processing data from additional satellites. By calculating the precise location of the navigational satellite, from the orbit data, at the instant when the broadcast was sent, and by comparing this with the time the broadcast was received, to establish the delay between when the broadcast was sent and when it was received, the terminal is able to calculate the propagation delay between the navigational satellite and itself. The propagation delay represents a measured distance between the navigational satellite and the terminal at the instant the broadcast was made. By listening to many different navigational satellites, the terminal is able to triangulate between them to provide a positional fix.

Effective though the GPS system undoubtedly is, it contains several disadvantages. Firstly, in order to avoid signal collision, the navigational satellites broadcast on different channels, separated by appropriately orthogonal spreading sequences. In order, when first switched on, for the terminal, not having any idea of its location or the present position of any navigational satellite, to establish its position, it is necessary for the terminal to listen for all navigational satellites on all known navigational satellite channels. Given that the GPS system has many satellites, and that only a handful of the navigational satellites are required for a positional fix, this represents a gross inefficiency and can require a "cold" terminal to wait for up to thirty minutes for a sufficient number of satellite channels to be scanned and for receiver clock inaccuracies to be resolved. The present invention seeks to provide a system and method, and a terminal for use in the system, whereby the "from cold" start-up time of a terminal can be reduced from a potentially long period to just a short period.

Because of its military origins, it is preferred that a GPS terminal should not transmit for fear of revealing the position of the terminal to an enemy. While the present invention seeks to incorporate the terminal within a satellite communications system, it nonetheless also seeks to provide a means whereby the start-up time of a cold terminal can be greatly reduced without any need for the terminal, in the satellite communications system, being required to transmit or being required to run orbit simulations for the navigational satellites.

The navigational satellites can move with considerable speed. If the navigational satellite is approaching a terminal, this results in a Doppler effect increase in the frequency of transmission of a broadcast signal. Likewise, if a navigational satellite is receding from a terminal, this results in a Doppler effect reduction on the frequency of a broadcast signal. The terminal cannot be certain exactly on what frequency the broadcast from the navigational satellite might be. The present invention seeks, by including the terminal within a communications satellite system, to remove this uncertainty so that acquisition of navigational satellite signals can rapidly be achieved, even without the necessity for the terminal to transmit.

The GPS terminal, in common with all terminals for navigational satellite position fixing systems, is a powerful data processor. It has to assemble the rather large amount of orbital data for each navigational satellite whose broadcasts it can receive. Thereafter, the terminal is required to process all of the data from many navigational satellites in order to calculate its position. While this may not be a problem for military systems where cost and size usually are not a problem, in the civilian market cost and size can be a paramount factor. This has the result that the terminal is often equipped only with a small microprocessor which, although quite capable of performing the necessary calculations and functions, takes a great deal of time to do so. The net result is a handheld terminal which, from cold, can take a very long time to present its user with a result. By incorporating the terminal within a communications network, the present invention seeks to relieve the terminal of this burden so that very simple and economic terminals can be employed.

Even a "hot" terminal can have a problem when it requires a position update. The terminal user may be in a hurry. The terminal user may not require a precise position fix. Nonetheless, this is all he or she can get. The terminal user has to wait until the terminal, even despite having a previous fix on its position, goes through all or part of the "from cold" routine. The present invention seeks to provide, by incorporating the terminal in a satellite communications network, a method and system whereby the terminal user can obtain a very rapid update or confirmation of his or her position, even faster that the fastest that can be obtained using the navigational satellites.

The terminal may find itself in a position of poor reception, such as when its radio paths are blocked by buildings, geographical features, and the like. Under these circumstances, it may not be possible for signals from a sufficient number of navigational satellites to be received for a position fix. The present invention seeks to provide means whereby the position of the terminal can be found provided the terminal has a view of, as a minimum, at least one navigational satellite and one communications satellite.

SUMMARY OF THE INVENTION

According to one aspect, the present invention consists in a navigational satellite positioning system wherein a terminal is operative to receive time and orbit information from a plurality of navigational satellites to calculate the position of the terminal, said system being characterised by including a communications network, operative to inform said terminal which of said plurality of navigational satellites are within range of said terminal, and by said terminal, in response thereto, listening only for those of said plurality of navigational satellites that are within range.

According to anther aspect, the present invention consists in a method for use in a navigational satellite positioning system wherein a terminal is operative to receive time and orbit information from a plurality of navigational satellites to calculate the position of the terminal, said method being characterised by the steps of employing a communications network to inform said terminal which of said plurality of navigational satellites are within range of said terminal, and by said terminal responding thereto to listen only for those of said plurality of navigational satellites that are within range.

According to another aspect, the present invention consists in a terminal, for use in a navigational satellite positioning system wherein said terminal is operative to receive time and orbit information from a plurality of navigational satellites to calculate the position of said terminal, said terminal being characterised by inclusion in a communications network, operative to inform said terminal which of said plurality of navigational satellites are within range of said terminal, and by said terminal, in response thereto, being operative to listen only for those of said plurality of navigational satellites that are within range.

The invention and its embodiment also provide a system and method, and a terminal for use in the system, where the terminal exchanges messages with the communications network to establish an approximate position for the terminal, the communications network, in response to a knowledge of the approximate position, calculates which of the plurality of navigational satellites are within range of the terminal, and the communications network informs the terminal which of the plurality of navigational satellites are within range of the terminal. Provision of this feature ensures that the terminal does not waste time searching for signals from navigational satellites that it simply cannot see, thus speeding up a positional fix.

The invention and its embodiment further provide a system and method, and a terminal for use in the system, where the communications network provides an array of abutting radio beams, and where the communications network periodically broadcasts, in each beam, information concerning which of the plurality of navigational satellites would be within range of a terminal in that beam. In the preferred embodiment, the communications network includes a satellite with 163 beams in an array. The invention can encompass other schemes. The provision of this feature allows the terminal to have a more or less comprehensive knowledge of what navigational satellites are available, without ever having to transmit to the either to a communications satellite or elsewhere.

The invention and embodiment further provide a system and method, and a terminal for use in the system, where the communications network calculates the approximate Doppler frequency shift for each of the plurality of navigational satellites that are within range, informs the terminal of the approximate Doppler shift for each of the plurality of navigational satellites that is within range, and the terminal responds by adjusting its frequency of reception to accommodate the approximate Doppler shift for the of said plurality of navigational satellites that is within range. The provision of this feature permits the terminal to receive the signals from the navigational satellites without first having to hunt around for their frequencies, thus saving further time in obtaining a position fix for the terminal.

The invention and embodiment further provide a system and method, and a terminal for use in the system, where the communications network comprises one or more communications satellites, where the terminal transmits to the one or more communications satellites and where each of the one or more communications satellites can transmit to the terminal, each of the one or more communications satellites sending and receiving signals from an earth station, the earth station exchanging signals with the terminal through the one or more communications satellites and thereafter, analysing the signals to determine the position of the terminal on the surface of the earth. This feature ensures that the approximate position of the terminal can be measured, using the communication satellite or satellites, to allow the earth station more accurately to calculate which navigational satellites will be in view at the terminal.

The invention and embodiment, yet further, provide a system and method, and a terminal for use in the system, where, when the one or more communications satellites comprises just one communications satellite, the exchanged messages between the terminal and said earth station are adapted to measure the Doppler shift due to motion of the one communications satellite relative to the terminal and to measure the radio propagation delay between the communications satellite and the terminal. This provision allows an approximate estimation of the position of the terminal, even if only one communications satellite is visible to the terminal.

The invention and embodiment, still further, provide a system and method, and a terminal for use in the system, where the communications satellite communicates with the terminal using one out of a plurality of beams, each of said plurality of beams being interactive with a respective one out of a plurality of areas on the surface of the earth, any ambiguity of position of the terminal being resolved by observation of with which out of the plurality of beams the terminal exchanges the signals. All position determinations for the terminal provide a plural set of points where intersecting loci, on the surface of the earth, provide a plurality of possible points where the terminal could be. This provision allows a rapid and easy solution to resolution of any uncertainty. In the preferred embodiment, each communications satellite provides an array of 163 abutting radio beams projected onto the surface of the earth. The invention, however, can encompass numerous other schemes.

Yet further, the invention and embodiment provide a system and method, and a terminal for use in the system, where, when the one or more communications satellites comprises more than one communications satellite, the exchanged signals between the earth station and the terminal are adapted to measure the propagation delay between each of the more than one communications satellites and the terminal. Thus, if the terminal can see two or more communications satellites, the approximate measurement of the position of the terminal is established using propagation delays between the terminal and each of the communications satellites in view. This provides a more accurate first approximation to the position of the terminal than the use of one communications satellite alone.

The invention and embodiment further provide a system and method, and a terminal for use in the system, where each of the one or more communications satellites provides a broadcast messages at predetermined times, the terminal measures and records the time of arrival of each broadcast message, the terminal reports back to the earth station the time of arrival of each received broadcast message, the earth station compares the reported time of arrival of each broadcast message with the predetermined times to calculate the propagation delay between the terminal and each of the one or more communications satellites, and the earth station calculates the position of the terminal, relative to each of the one or more communications satellites, based on a knowledge of the actual position of each of the one or more communications satellites at the predetermined times. This feature exploits the ability of the terminal to communicate with the earth station, to remove from the terminal the onus of great information storage and computing capacity. The earth station can have a common, rapid computational capacity which can be used for many terminals, allowing the terminals to be considerably simplified and reducing their cost.

Still further, the invention and embodiment provide a system and method, and a terminal for use in the system, where the earth station is operative to send out a message, via each of the more than one communications satellite, and where the terminal is operative to return the message within a predetermined time of receipt of the message via each of said more than one communications satellite, the earth station being operative thereby to calculate the propagation delay between the more than one communications satellites and the terminal. This feature provides a manner whereby the earth station can measure the propagation delay to establish a distance between each communications satellite and the terminal.

Even further, the invention and its embodiment provide a system and method, and a terminal for use in the system, where the earth station sends the message via each of the more than one communications satellites an optimum number of times, dependently upon the estimated position of the terminal with respect to each of the more than one communications satellites, and to take the average of the propagation delays derived therefrom. This permits the initial approximate measurement of the position of the terminal to be made with greatest accuracy and exploits the unexpected fact that accuracy of position determination actually grows better up to a certain number of measurements, and thereafter deteriorates.

The invention and its embodiment, even further, provide a system and method, and a terminal for use in the system, where the terminal detects and records the time of arrival of broadcast messages from communications satellites which are no longer in sight and reports the previous broadcast messages to the earth station, the earth station using knowledge of the position of the communications satellites, no longer in sight, at the time of receipt of the broadcast message by the terminal to assist in the calculation of the position of the terminal. By this means, assuming the terminal has not moved a significant distance since the receipt of the first broadcast message, the earth station can make a virtually instant approximation of the terminal's position based on a stored history, in the terminal, of those communications satellites it has already heard.

The invention and its embodiment, even further, provide a system and method, and a terminal for use in the system, where the terminal detects and records the time of arrival of broadcast messages from navigational satellites which are no longer in sight and reports the previous broadcast messages from the navigational satellites to the earth station, the earth station using knowledge of the position of the navigational satellites, no longer in sight, at the time of receipt of the broadcast message from the navigational satellites by the terminal to assist in the calculation of the position of the terminal. By this means, again, assuming the terminal has not moved a significant distance since the receipt of the first broadcast message from a navigational satellite, the earth station can make a virtually instant approximation of the terminal's position based on a stored history, in the terminal, of those navigational satellites it has already heard.

The invention and its embodiment also provide that the system and method, and a terminal for use in the system, include the terminal being capable of noting the apparent recorded time, reported by the terminal, between two know intervals and thereby correcting for drift and offset error in the timer in the terminal. The internal clock, in the terminal, for reasons of economy, is subject to systematic error, environmental drift and numerous other errors. The clock, in the terminal, will therefore, in all probability, show the wrong time and keep bad time. By noting the errors in the clock in the terminal, at least for a short while, the earth station can correct for them.

The invention and its embodiment further provide that, when just one communications satellite is visible to the terminal, the system and method, and a terminal for use in the system, include the earth station exchanging the messages with the terminal a first optimum number of times to establish, by averaging, the Doppler shift and a second optimum number of times to establish, by averaging, the propagation delay, the first and second optimum number of times being dependent upon the estimated position of the terminal. The number of times that a quality is sampled for optimum accuracy depends upon which quality is being measured and the approximate position of the terminal. The terminal, in the preferred embodiment, is in one of the 163 radio beams sent out by the communications satellite, thereby establishing a rough guess at the terminal's position, though other methods could be encompassed by the invention and its embodiment.

The invention and its embodiment also provide that the communications satellite sends, to the earth station, a signal on a first generated frequency, and that the earth station sends a signal at a first known frequency to the communications satellite the communications satellite using an internal oscillator to transpose the signal of a first known frequency and return the transposed signal to the earth station on a first transposed frequency, the earth station measuring the first generated frequency and the first transposed frequency and deriving therefrom the Doppler shift between earth station and the communications satellite and the error in the internal oscillator in the communications satellite. This simple process, exploiting the synthesis and transposition capacity of the communications satellite, allows the satellite to be "calibrated" by the earth station so that the satellite itself can be come an accurate source and relay of signals for the terminal.

The invention and its embodiment also include the earth station, after having derived the Doppler shift between the earth station and the communications satellite and the error in the internal oscillator in the communications satellite, causing the communications satellite to send a signal at a second known frequency to the terminal, the terminal using an internal oscillator to transpose the signal of a second known frequency and return the transposed signal to the earth station, through the communications satellite, on a second transposed frequency, the terminal is sending, to the earth station, via the communications satellite, a signal on a second generated frequency, the earth station measuring the second transposed frequency and the second generated frequency and deriving therefrom the Doppler shift between the communications satellite and the terminal and also deriving the error in the internal oscillator in the terminal. Thus, the satellite having been "calibrated" by the earth station, the earth station compensates for the known "calibration" of the satellite to use the satellite to "calibrate" the terminal.

The invention and its embodiment further provide a system and method, and a terminal for use in the system, where the earth station calculates the approximate Doppler frequency shift for each of the plurality of navigational satellites that are within range, informs the terminal, via the communications satellite, of the approximate Doppler shift for each of the plurality of navigational satellites that is within range, and where, in response, the terminal adjusts its frequency of reception to accommodate the approximate Doppler shift for each of the plurality of navigational satellites that is within range.

In the preferred embodiment, the communications network is a satellite communications network. However, the invention also encompasses the communications network including a terrestrial radio telephone network.

The invention and its embodiment also provide a system and method, and a terminal for use in the system, including the communications network, preferably a satellite communications network, informing the terminal of the established approximate position for the terminal and, in response thereto, the terminal providing a user interpretable indication of said established approximate position. In the preferred embodiment the user interpretable indication is chosen to be by means a visual display, preferably the same display used to provide other functions on the terminal. The invention, however, encompassed the user interpretable indication being audible, or by any other means or combination of means whereby information can be provided to a human being.

Where the approximate position of the terminal is measured, the invention and its preferred embodiment provide a system and method, and a terminal for use in the system, where the terminal receives a signal, sent from a known position at a known time from a known navigational satellite, notes the time of arrival of the signal and communicates the time of arrival to the earth station, the earth station calculating the distance between the known navigational satellite and the terminal and said incorporating the calculated distance in the estimation of the position of said terminal. This permits a measurement of the position of the terminal to be made using a combination of the results from the communications satellite or satellites and one or more navigational satellites. The known navigational satellite, in the signal, provides indication of its identity, the terminal detects the identity, and conveys it to the earth station. Likewise, the navigational satellite in the signal, also provides indication of the time of origin of the signal from said navigational satellite, the terminal conveying, to the earth station, indication thereof.

The invention and its preferred embodiment provide a system and method, and a terminal for use in the system, where the navigational satellite is a satellite in a constellation other than that occupied by the communications satellite, preferably but not exclusively a constellation comprising a plurality of navigational satellites. The invention also encompasses that the communications satellite can also serve as a navigational satellite.

The invention further provides, in its preferred embodiment, that the terminal responds to any of the plurality of navigational satellites from which a signal can be received and that the earth station responds to information, received from the terminal, concerning any of the plurality of navigational satellites from which a signal can be received by terminal.

Finally, the invention and its embodiment provide a system and method, and a terminal for use in the system, where the terminal commences a timing operation on receipt of a message from the earth station, terminates the timing operation on receipt of a signal from the navigational satellite, and employs the measured, elapsed time of the timing operation as the time of arrival of the signal at the terminal, the earth station is operative to using the propagation delay between the earth station and the terminal to deduce the true time of arrival of the signal, from the navigational satellite, at the terminal. This measure reduces any systematic errors in the clock at the terminal to simple, second order effects by taking only the difference in time between two events, rather than the absolute recorded time.

BRIEF DESCRIPTION OF THE DRAWINGS

The invention is further explained, by way of example, by the following description, taken in conjunction with the appended drawings, in which.

DETAILED DESCRIPTION

The embodiment of the invention falls into three parts. Firstly, the terminal must have an ability to interact with the navigational satellites. Secondly, the communications system, preferably a satellite communications system, must be able to inform the terminal which navigational satellites are in view. Thirdly, the communications system must be able to estimate the position of the terminal.

The description of the preferred embodiment commences with a description of the communications satellite system.

Figure 1:
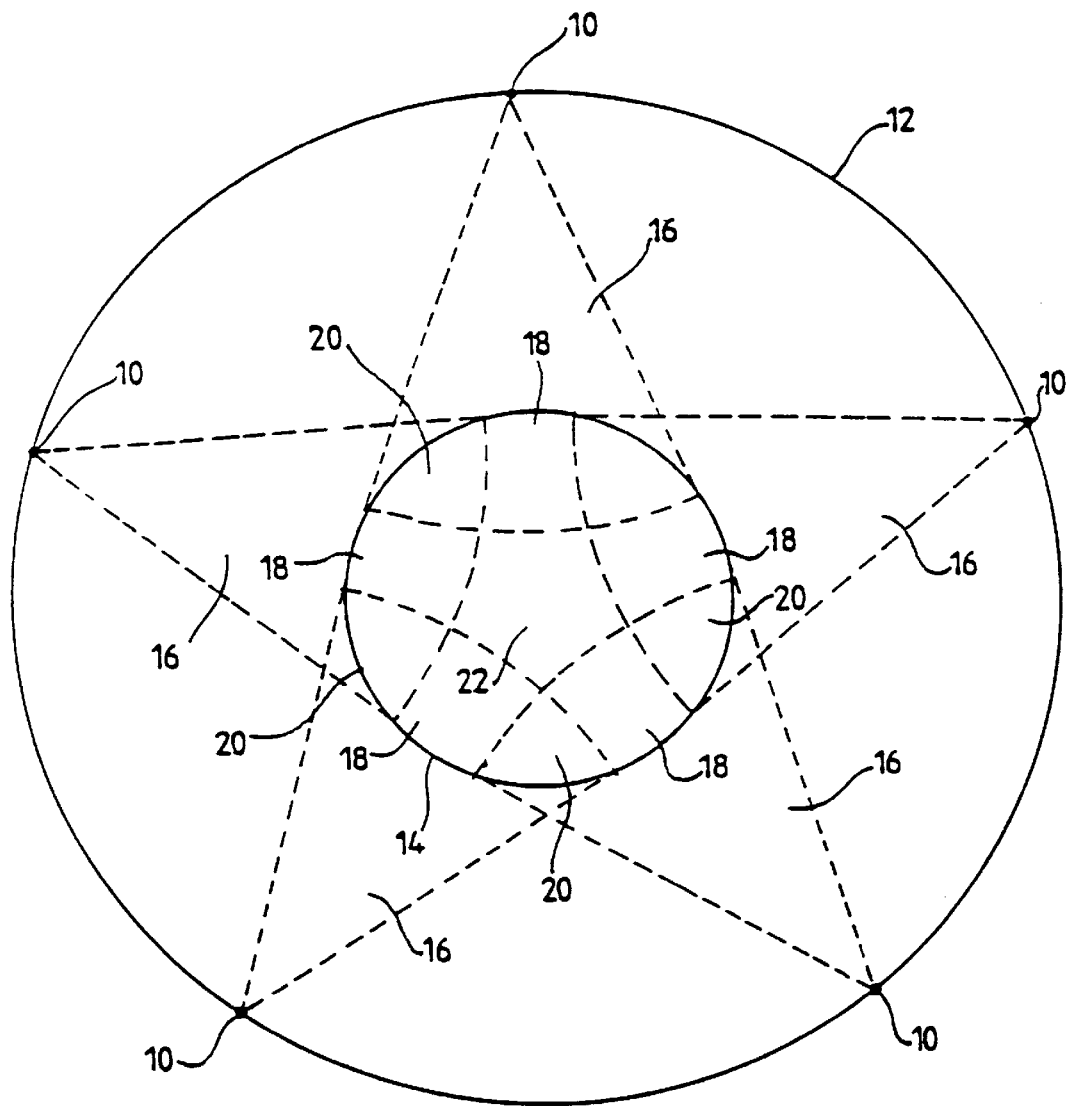
FIG. 1 shows a planar constellation of communications satellites disposed about the earth.

FIG. 1 shows a planar constellation of communications satellites disposed about the earth. The plurality of communications satellites 10 are evenly disposed around a circular orbit 12 above the surface of the earth 14. Each of the communications satellites 10 is designed to provide radio communications with apparatus on the surface to the earth 14 when the individual communications satellite 10 is more than 10 degrees above the horizon. Each communications satellite 10 therefore provides a cone 16 of radio coverage which intersects with the surface of the earth 14.

The surface of the earth has three types of areas. A first type of area 18 is one which has radio coverage from only one communications satellite 10. A second type of area 20 is an area where there is radio coverage from more than one communications satellite 10. Finally, a third type of area 22 receives radio coverage from none of the communications satellites 10 in the orbit 12 shown.

Figure 2:
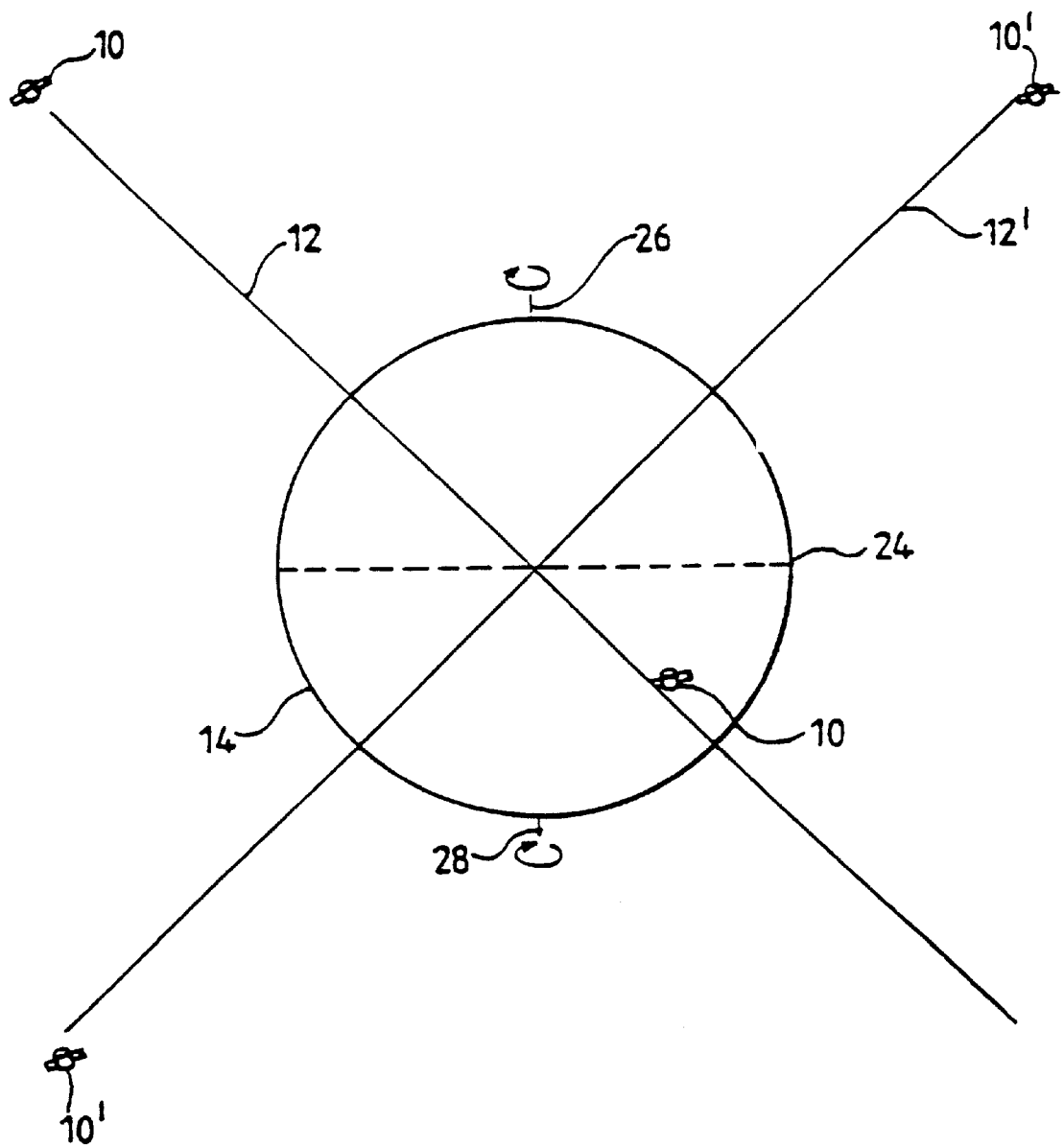
FIG. 2 illustrates how the communications satellites are disposed in orthogonal orbital planes.

FIG. 2 illustrates how the communications satellites 10 are disposed in orthogonal orbital planes. The first orbit 12 of FIG. 1 is supplemented by a second orbit 12' having communications satellites 10 disposed there about in a similar manner to that shown in FIG. 1. The orbits 12' are orthogonal to one another, each being inclined at 45 degrees to the equator 24 and having planes which are orthogonal (at 90 degrees) to each other.

In the example shown, the communications satellites 10 orbit above the surface of the earth 14 at an altitude of 10 355 km. Those skilled in the art will be aware that other orbital heights and numbers of communications satellites 10 may be used in each orbit 12, 12'. This configuration is preferred because the example provides global radio coverage of the earth 14, even to the north 26 and south 28 poles, with a minimum number of communications satellites 10. In particular, the orthogonality of the orbits ensures that the communications satellites 10 of the second orbit 12' provides radio coverage for the third types of area 22 of no radio coverage for the communications satellites in the first orbit 12, and the communications satellites 10 in the first orbit 12 provide radio coverage for those areas 22 of the third type where the communications satellites 10 of the second orbit 12' provide no radio coverage. By such an arrangement, it is ensured that every point, on the surface of the earth 14, has, at least, one communications satellite 10 10', visible at all times.

It will become clear that, although the two orbits 12, 12' are here shown to be of the same radius, the embodiment of the invention as hereinbefore and hereinafter described will function with orbits 12, 12' of different radii. Equally, there may be more than two orbits 12, 12'. So far as the embodiment of the present invention is concerned, the only requirement is that every part of the surface of the earth 14 is in receipt of radio coverage from at least one communications satellite 10 at all times.

Figure 3:
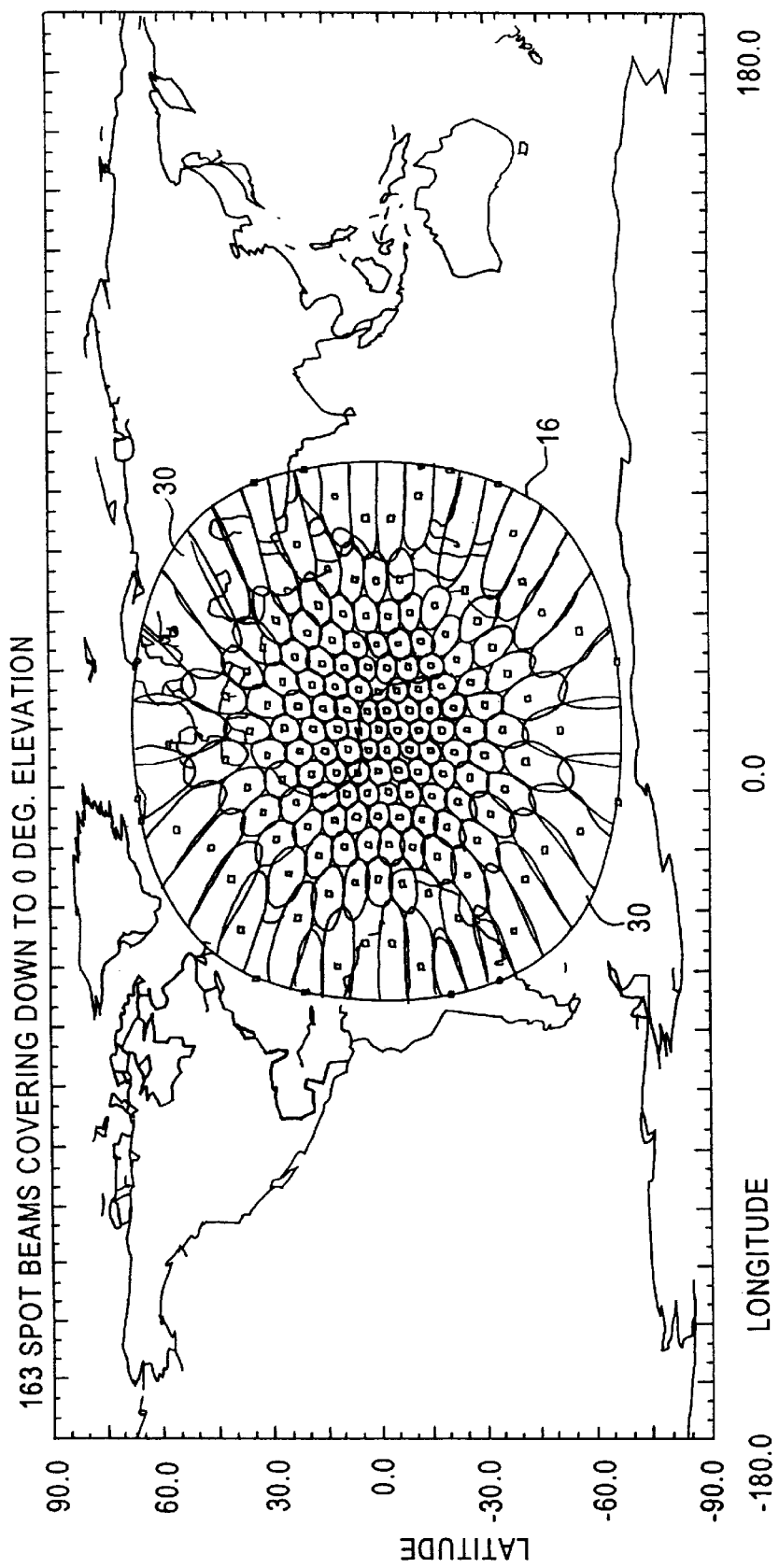
FIG. 3 shows the structure of the cone of radio coverage provided by each communications satellite.

FIG. 3 shows the structure of the cone 16 of radio coverage provided by each communications satellite 10. For convenience, the radio coverage cone 16 is shown centred, on a map of the earth, at latitude 0 degrees at longitude 0 degrees. The cone 16 of radio coverage is divided into a plurality of spot beams 30, by means of a corresponding plurality of directional antennae on the communications satellite 10. The communications satellite 10 is intended for mobile radio telephone communications and each of the spot beams 30 corresponds, roughly, to the equivalent of a cell in a cellular radio telephone network. In FIG. 3, the cone of radio coverage 16 is distorted due to the geometry of the map of the earth's surface provided. FIG. 3 also shows the extent of interaction of the cone 16 of radio coverage down to the edges of the cone 16 being tangential to the earth's surface, that is, to the point where the cone 16 represents a horizontal incidence at its edges, with the surface of the earth. By contrast, FIG. 1 shows the cone 16 at a minimum of 10 degrees elevation to the surface of the earth.

It is to be observed, that because of the curvature of the earth, the spot beams 30 are of near uniform, slightly overlapping circular shape at the centre whereas, at the edges, the oblique incidences of the spot beams 30 onto the surface of the earth 14 causes considerable distortion of shape.

Figure 4:
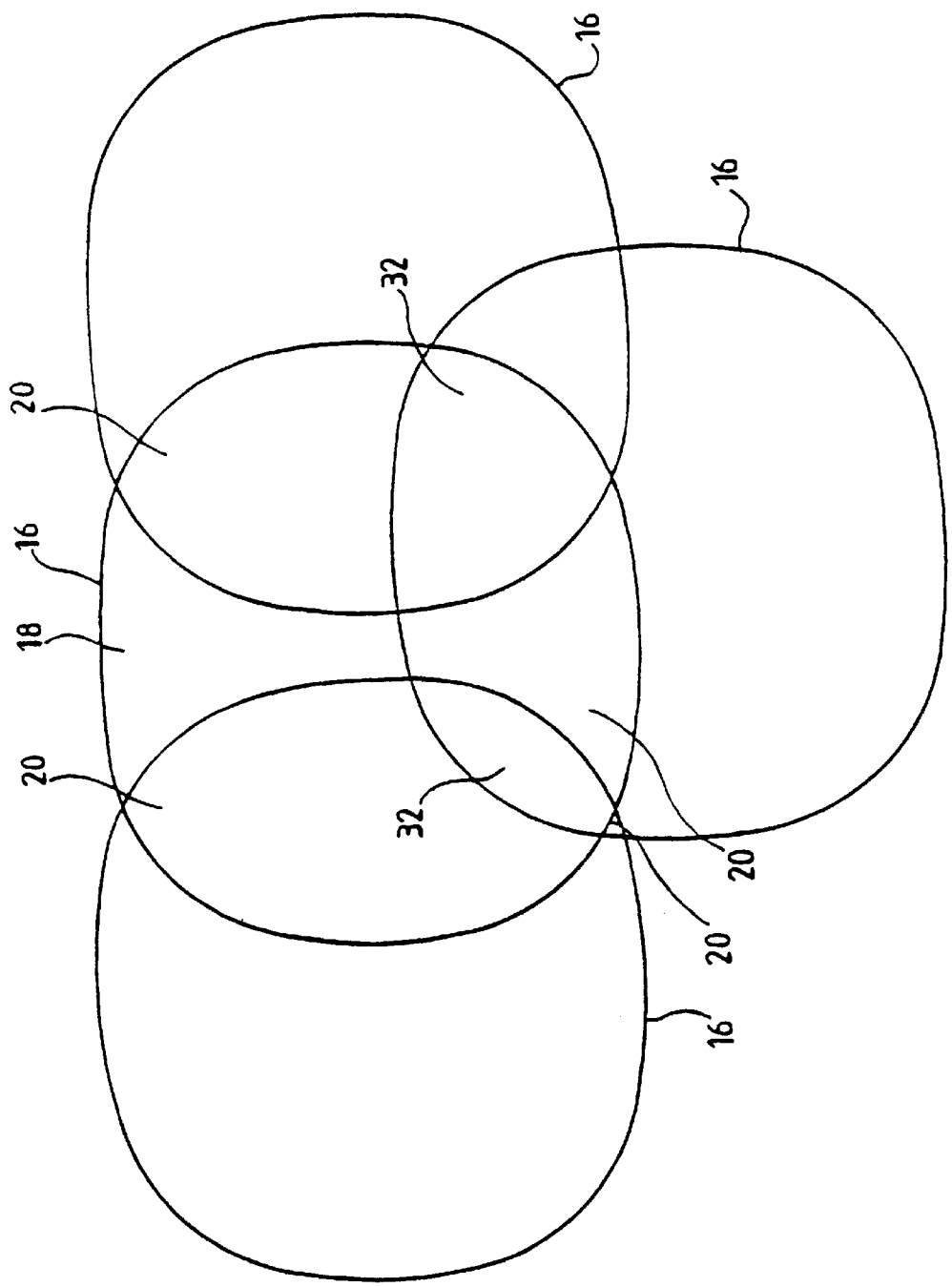
FIG. 4 shows how the cones of radio coverage, shown in FIG. 3 may interact with the surface of the earth to produce many types of different regions.

FIG. 4 shows how the cones 16 of radio coverage may interact with the surface of the earth to produce many types of different regions.

As discussed with reference to FIG. 1, numerous cones or radio coverage 16 may overlap to produce first areas 18 where there is radio coverage by only one communications satellite, second areas 20 where there is radio coverage by two communications satellites, and even fourth areas 32 where coverage is provided by three or more communications satellites. It is to be understood that each of the cones 16 of radio coverage represented in FIG. 4 is divided, as shown in FIG. 3, into its own independent set of spot beams 30.

Figure 5:
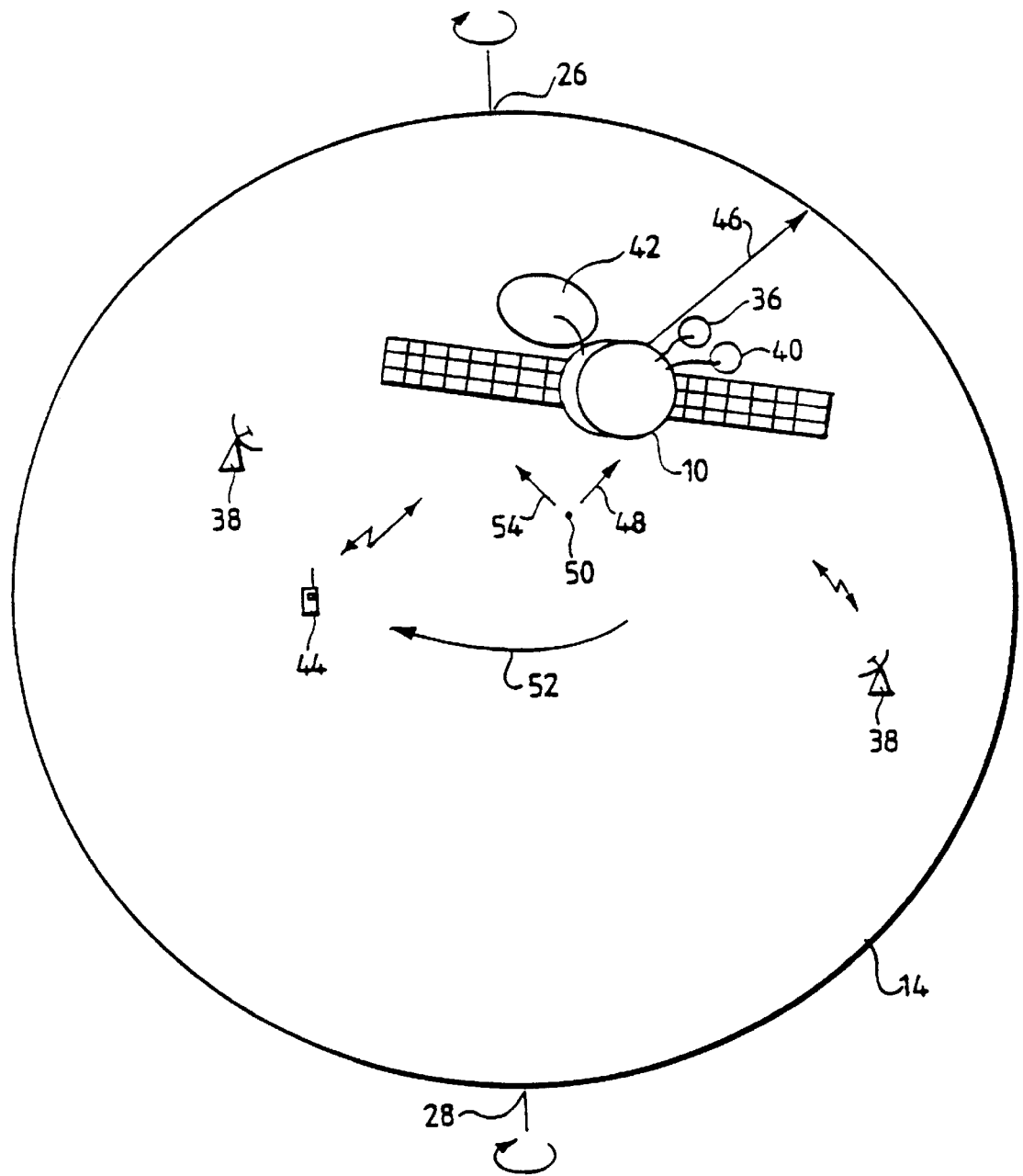
FIG. 5 is a view, from above, of a communications satellite above the surface of the earth, illustrative of the various motions relative to the earth.

FIG. 5 is a view, from above, of a communications satellite 10 above the surface of the earth.

The communications satellite 10 comprises solar panels 34 for power supply, a downlink antenna 36 for sending bulk telephone traffic to one of a plurality of earth stations 38, an uplink antenna 40 for receiving general traffic from the earth stations 38, and a subscriber antenna 42 which provides the plurality of spot beams 30, shown in FIG. 3, intended to provide communications with terminals 44 which may be provided in a form not dissimilar to a hand held cellular radio telephone. It is to be understood that the terminal 44 may also comprise more elaborate vehicle mounted equipment for use in land vehicles, ships and aircraft.

With the parameters mentioned in this preferred example, the communications satellite moves around its orbit 12 12', as indicated by a first arrow 46, with a velocity of 4.9 km per second. Ignoring for the moment the rotation of the earth 14, the spot beams 30 also move across the surface of the earth 14 with a similar velocity along a ground track as indicated by a second arrow 48. The point immediately beneath the communications satellite, is known as the nadir 50.

At the same time the earth 14 is rotating, at its equator with a velocity of 0.47 km per second, as indicated by a third arrow 52. Directions, relative to the ground track 48, at 90 degrees thereto, are termed crosstrack as indicated by a fourth arrow 54. Hereinafter, the position of the terminal 44 is defined with reference to its distance along the ground track 48 and its distance along the cross track 54 with reference to the nadir 50.

Figure 6:
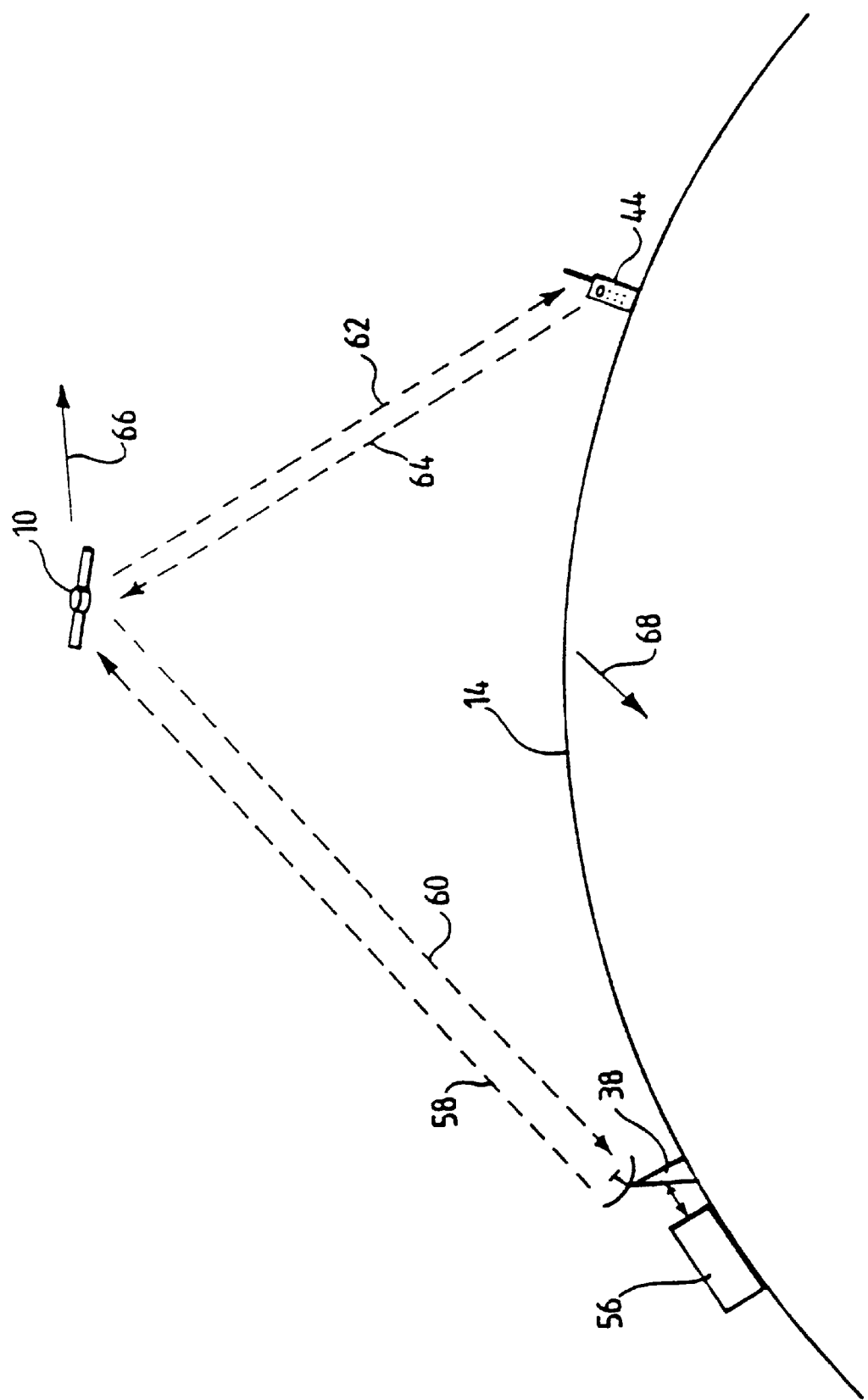
FIG. 6 is a schematic view of the general situation where an earth station talks to a terminal via the communications satellite to determine propagation delays between the terminal and the communications satellite.

FIG. 6 is a schematic view of the general situation where an earth station 38 talks to a terminal 44 or via the communications satellite 10.

The earth station 38 further comprises an earth station controller 56 which controls the activity of the earth station 38. The earth station 38 is located at a first point on the surface of the earth 14 and the terminal 44 may be at any other point on the surface of the earth within range of the communications satellite 10 when the communications satellite 10 is in range of the earth station 38.

The earth station 38 communicates with the communications satellite 10 via an uplink radio link 58, via the uplink antenna 40 of FIG. 5, using frequencies in the band 5150 to 5250 megahertz. The earth station 38 receives signals from the communications satellite 10 via the downlink antenna 36 of FIG. 5 on a downlink radio link 60 using signals in the frequency range 6975 to 7075 megahertz.

The terminal 44 receives signals from the communications satellite 10 via a terminal downlink 62 using frequencies in the range 2170 to 2200 megahertz. The terminal 44 sends messages and signals to the communications satellite 10 via a terminal uplink 64 operating in the frequency band 1980 to 2010 megahertz. These frequencies are merely exemplary and those skilled in the art will be aware from the following description, that the invention could be practised using numerous other frequencies for the uplinks and downlinks.

Implicit in FIG. 6, but not specifically shown, is the fact that communications satellite 10 contains its own precise oscillator, conveniently in the form of a crystal oscillator, which the communications satellite 10 uses for converting the frequencies of incoming and outgoing signals and for use as a frequency reference when synthesising frequencies. Likewise, the terminal 44 contains its own internal synthesised oscillator, working from a master oscillator, preferable a crystal oscillator, for converting frequencies of incoming signals and synthesising the frequencies of outgoing signals.

Equally, the earth station 38 and the earth station controller 56 between them contain, or have access to, extremely precise frequency references and time references. These references may actually be contained within the earth station 38 and the earth station controller 56, or may be derived from elsewhere via a land line or other service.

The exact location, on the surface of the earth 14, of the earth station 38, is known with great precision. Likewise, the parameters or the orbit 12 12' of the communications satellite 10 and its position in that orbit, at any instant, are also known with great precision. The uncertain element, which is the purpose of the present invention to resolve, is the position of the terminal 44 on the surface of the earth 14.

Not previously mentioned, is the fact that the terminal 44 transmits on the terminal uplink 64 to the subscriber antenna 42 and similarly receives on the terminal downlink link 62 from the subscriber antenna 42. The communications satellite 10 will only be in communication with one earth station 38 at a time, but may be in communication with a great many terminals 44. Each terminal will be in one particular spot beam 30 of the plurality of spot beams shown in FIG. 3.

The communications satellite 10 will be moving relative to the surface of the earth 14, and therefore relative to the earth station 38 and to the terminal 44, as indicated in a fifth arrow 66. Likewise, the surface of the earth 14 will be moving relative to the orbit 12 12' of the communications satellite 10 as generically indicated by a sixth arrow 68.

The signals exchanged between the earth station 38 and the communications satellite 10, in common with the signals exchange between the terminal 44 and the communications satellite 10, all enjoy a propagation delay and a frequency shift, due to the motion of the communications satellite 10 relative to the earth station 38 and to the terminal 44 caused by the Doppler effect. The present embodiment of the invention, in part, concerns itself with means of employing the Doppler shift in frequencies, due to the motion of the communications satellite 10, and measurement of the propagation delay, to determine the position of the terminal 44 on the surface of the earth 14.

Propagation delay is measured between the earth station 38 and the terminal 44 to establish the propagation delay between the terminal and the communications satellite 10. The earth station 38 sends out a signal on the uplink radio link 58 to the communications satellite 10 which is, in turn, sent to the terminal 44 via the terminal downlink 62. Upon receipt of the signal from the earth station 38, the terminal waits for a predetermined period and then sends its own message, via the terminal uplink 64 and the downlink radio link 60, back to the earth station 38. The earth station controller 56 notes the elapse of time from the instant that the earth station 38 began to transmit the message on the uplink radio link 58 and the instant when the earth station 38 began to receive the response message from the terminal 44 from the downlink radio link 60. The earth station controller 56 knows the propagation delay times for signals, through the communications satellite 10, from the uplink radio link 58 onto the terminal downlink 62 and, correspondingly, the propagation delay through the communications satellite 10 between the terminal uplink 64 and the downlink radio link 60. Equally, the earth station controller 56 knows, with precision, the predetermined elapsed time employed by the terminal 44 before it responds to the received message from the earth station 38. These propagation delays and the predetermined delay of the terminal 44 are subtracted, by the earth station controller 56, from the overall elapsed time to determine the actual propagation delay of the radio wave via the various links 58, 60, 62, 64 in the return journey of the message from and to the earth station 38. The radio wave propagates always at the speed of light, which is constant. Because the position of the earth station 38, on the surface of the earth, is precisely known, and because the position of the communications satellite 10 in its orbit 12 12' is also precisely known, the sum of the propagation delays on the uplink radio link 58 and the downlink radio link 60 can be precisely calculated. The earth station controller 56 is already aware of the over all elapsed time for the propagation of the message along the radio paths 58, 60, 62, 64. By subtracting the calculated delay on the radio path 58 60 between the earth station 38 and the communications satellite 10 from the overall propagation delay, the propagation delay between the terminal 44 and the communications satellite 10 may, precisely, be measured. This means that, since the propagation is entirely at the speed of light, the linear distance between the communications satellite 10 and the terminal 44 is known. According to the propagation delay, the terminal may exist on any point of a spherical surface centred on the communications satellite 10. Because the spherical surface intersects the surface of the earth 14, and the terminal 44 is on the surface of the earth, the location of the terminal 44 may be inferred as being on the line intersection of the spherical surface of the earth 14 and the sphere of measured distance centred on the communications satellite 10.

Figure 7:
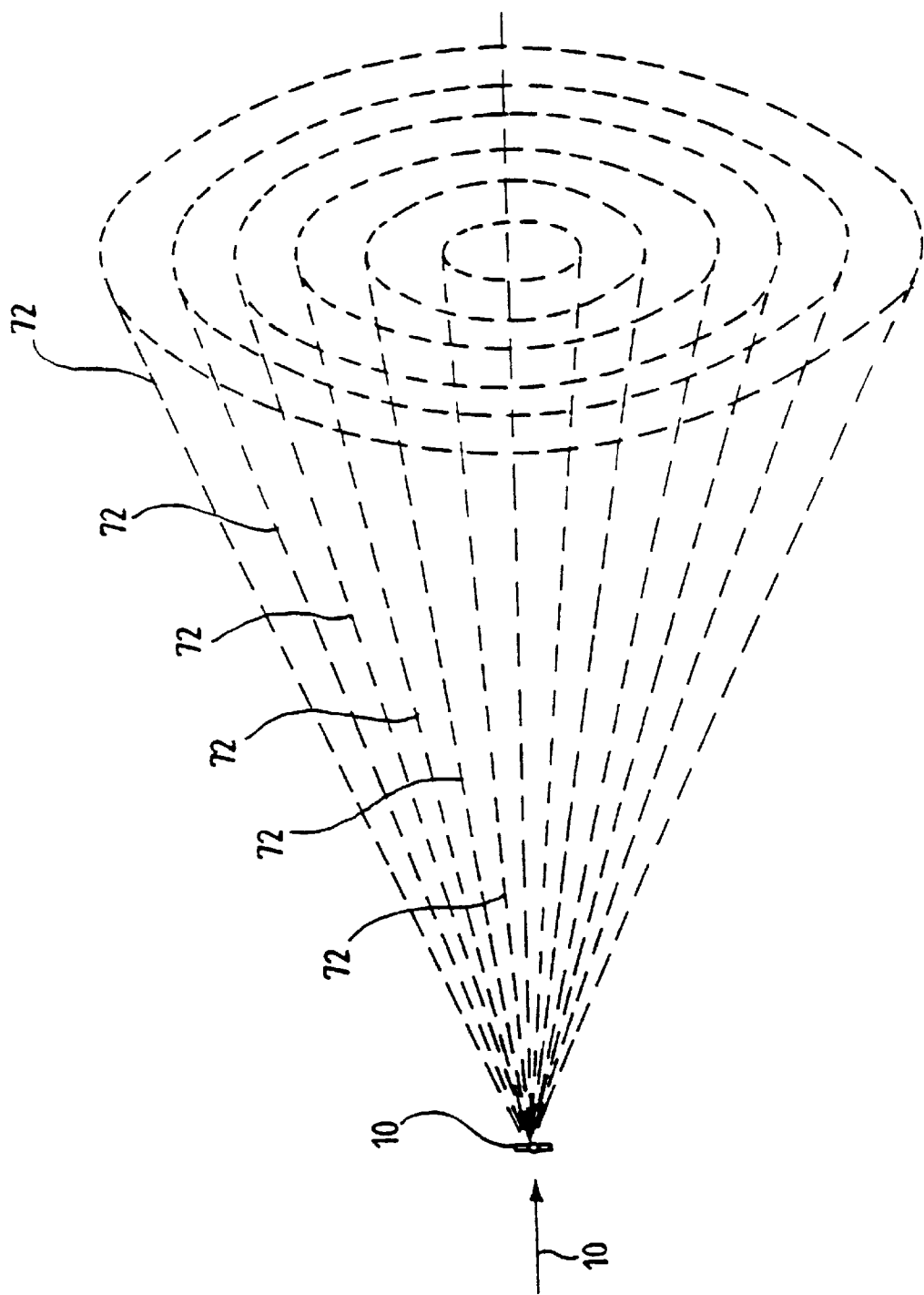
FIG. 7 shows the geometry of Doppler frequency shift measurement for the communications satellite.

FIG. 7 shows the geometry of Doppler frequency shift measurement for the communications satellite 10. As the communications satellite 10 moves as indicated by a 7th arrow 70, the change in frequency of a radio signal sent from the communications satellite 10 and the perceived frequency of a radio signal received by the communications satellite 10 from a fixed source such as the terminal 44, depends upon the cosine of the angle between the communications satellite 10 and the recipient of a transmitted radio signal from the communications satellite or the source of a transmitted radio signal to the communications satellite 10. Accordingly, if we plot those regions in space for pre-determined Doppler frequency changes, there is obtained a series of coaxial cones 72 having the communications satellite 10 at their collective apex, extending towards infinity, and having, as their collected axis 74, the direction of the motion of the communications satellite 10 as indicated by the 7th arrow 70. FIG. 7 shows the cones 72 extending only for a finite distance. It is to be understood that the cones 72 are of infinite extension. Likewise, FIG. 7 has only shown the cones "in front" of the communications satellite for radio frequencies receivers or sources which the communications satellite 10 is approaching. It is to be understood that a corresponding set of coaxial cones 72 extend "behind" the communications satellite, having the same apex and axis. The Doppler shift "in front" of the communications satellite 10 is shown by an increase in frequency. The Doppler shift "behind" the communications satellite 10 is provided by a corresponding decrease in frequency.

Where the cones 72 cut the surface of the earth 14, for a particular Doppler frequency shift, defines a further line along which the terminal 44 may be located.

Referring again to FIG. 6, a Doppler frequency shift measurement is executed by the earth station 38 providing a signal of known frequency on the uplink radio link 58. The communications satellite 10, using its own internal oscillator, translates the frequency of the signal and provides it on the terminal downlink 62. The terminal 44 then returns the signal via the terminal uplink 64, once again to be converted in frequency by the internal oscillator of the communications satellite 10 and sent back to the earth station 38 via the downlink radio link 60. The earth station controller 56 measures the frequency of the downlink radio link 60 signal and deduces the Doppler frequency shift, at the terminal 44, resulting from the motion of the communications satellite 10 as indicated by the 5th arrow 66.

Figure 8:
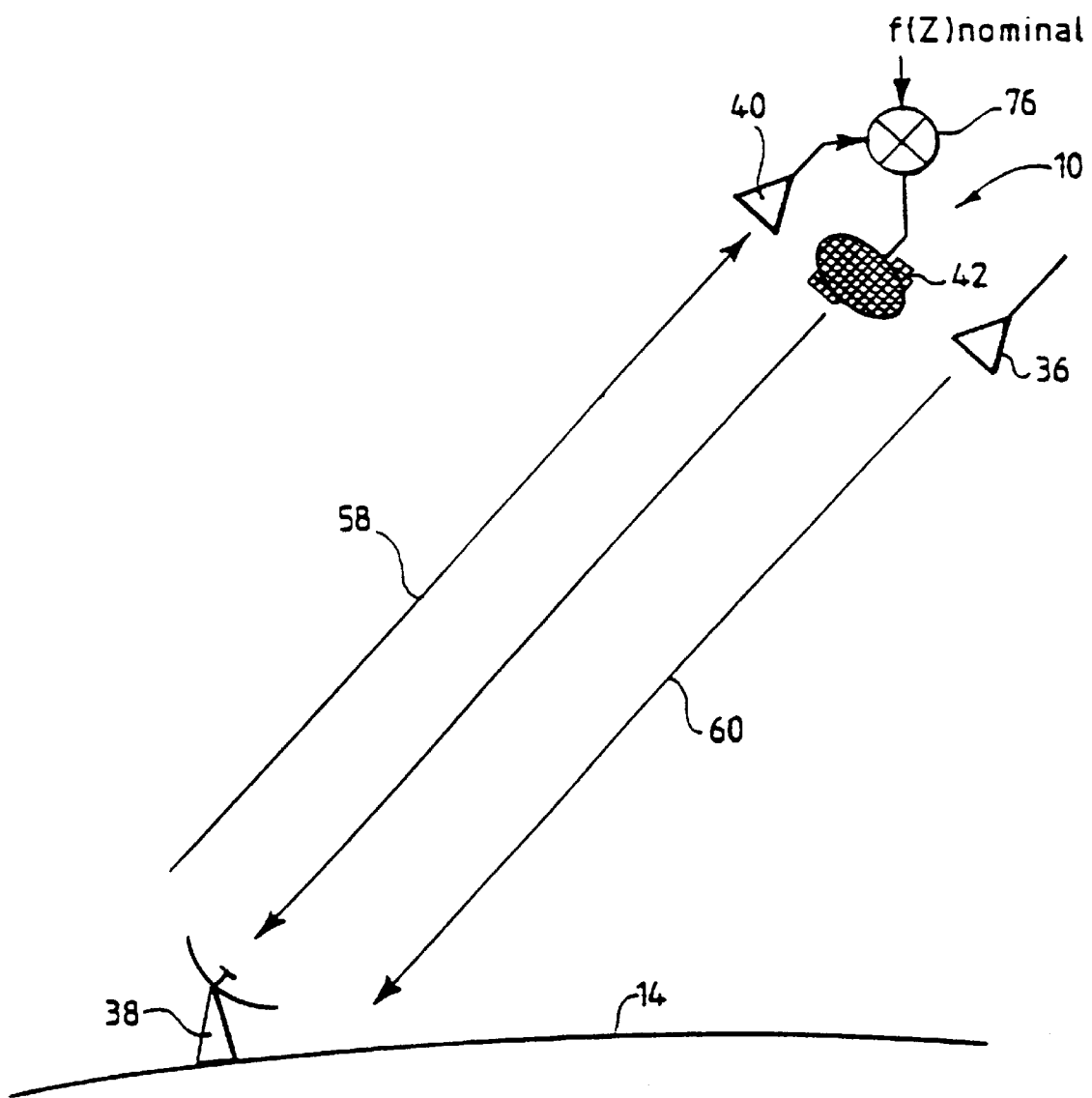
FIG. 8 is a schematic representation of the exchange of test signals between the earth station and the communications satellite to determine the relative Doppler shift and internal oscillator error of the communications satellite.

FIG. 8 is a schematic diagram of the manner in which the earth station 38 and the earth station controller 56 interact with the communications satellite 10 to calibrate the errors and Doppler shift experienced between the earth station 38 and the communications satellite 10.

The earth station 38 sends a signal of know frequency f(1) on the uplink radio link 58 to the communications satellite 10. The communications satellite 10 has an internal master oscillator which controls all of the synthesised frequencies used by communications satellite 10. If the master oscillator has a proportional error m, then any frequency, synthesised using the master oscillator, in the communications satellite, is proportionally in error, so that:

$$f(\text{actual})=(1+m)f(\text{intended})$$

Likewise, the communications satellite 10 is moving with respect to the earth station 38, thus introducing a proportional Doppler shift, let us call it d, so that, no matter whether the signal goes from the earth station 38 to the communications satellite 10, or from the communications satellite 10 to the earth station 38:

$$f(\text{received})=(1+d)f(\text{sent})$$

Thus, if the earth station sends a frequency f(1) on the uplink radio link 58 to the communications satellite 10, because of Doppler shift the communications satellite receives a frequency $$f(\text{received at communications satellite})=f(1)(1+d)$$

Now, the communications satellite employs a frequency changer 76 to convert the signal, received from the earth station 38, to a frequency suitable for use via the subscriber antenna 42. In order so to do, the communications satellite 10 synthesises an intended frequency f(2) to be subtracted from frequency of the signal received at the communications satellite 10 from the earth station 38. The intended frequency f(2) is subject to the proportional error in the master oscillator on the communications satellite 10, and so becomes f(2)(1+m).

The output of the frequency changer 76 is thus:

$$f(1)(1+d)-f(2)(1+m)$$

and this is sent, back to the earth station 10, via the subscriber antenna 44. But the communications satellite 10 is moving, and thus imparts a further Doppler shift. Thus, the frequency, received by the earth station 38 from the subscriber antenna 42, let us call it f(R1), is given by $$f(R1)=(1+d)(f(1)(1+d)-f(2)(1+m))$$

The earth station controller 56 measures f(R1) with extreme precision. Thus, f(R1), f(1) and f(2) are all known numbers, but m and d are unknown. Expanding the expression for f(R1) we obtain $$f(R1)=(f(1)-f(2))+d(2f(1)+d^2f(1))-mdf(2)-f(2)m$$

The second order terms $d^2f(1)$ and $mdf(2)$ are insignificant compared to the other terms, and can be ignored.

Thus $f(R1)=f(1)-f(2)+d(2f(1)+(2)-mf(2))$

The communications satellite 10 synthesises a third signal, with frequency f(3), which it sends via the downlink radio link 60 to the earth station 38. The third signal f(3) is subject to the proportional error of the master oscillator in the communications satellite 10. Thus, the actual frequency sent on the downlink radio link 60 becomes:

$$(1+m)f(3)$$

Since the communications satellite 10 is moving, the signal on the downlink radio link 60 is also subject to Doppler shift. The frequency, f(R2), received at the earth station 38 on the downlink radio link 60 is thus given by:

$$f(R2)=(1+d)(1+m)f(3)$$

thus $f(R2)=f(3)+df(3)+mf(3)+mdf(3)$

The second order term mdf(3) is very small compared to the other terms and can be ignored. This leaves the following equations.

$$f(R1)=f(1)-f(2)+d(2f(1)-f(2))-mf(2)$$

and $f(R2)=f3(1+d+m)$

Now, f(1), f(2) and f(3) are precisely know numbers and f(R1) and f(R2) are accurately measured and thus known. This reduces the equations to being two simultaneous equations in two unknowns, namely m and d, which can thus be solved for the unknowns.

Figure 9:
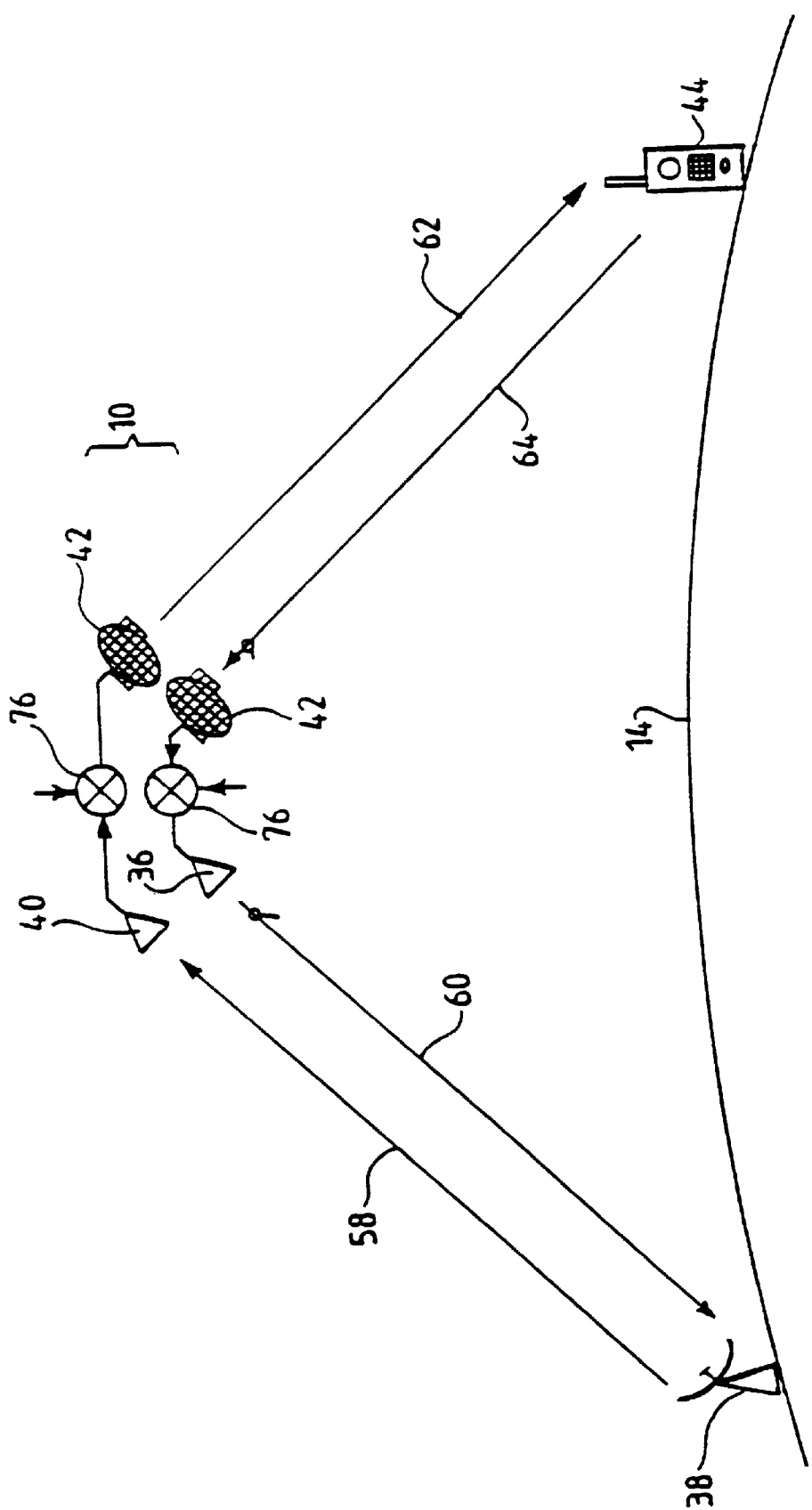
FIG. 9 is a schematic representation of how a calibrated communications satellite, according to FIG. 8, may, in turn, be used to determine the relative Doppler shift between the communications satellite and terminal and the internal oscillator error in the terminal.

FIG. 9 is a schematic view of how the earth station 38 measures the proportional Doppler shift error and master oscillator error on the terminal 44.

The earth station 38 and the earth station controller 56 first 'calibrate' the communications satellite 10 as described with reference to FIG. 8. Being able to predict the behaviour the communications satellite 10, the earth station 38 effectively moves its point of operation from the surface of the earth 14 and places it at the communications satellite 10. The communications satellite 10 will show a different Doppler shift with respect to the earth station 38 than it displays with respect to the terminal 38.

The subscriber antenna 42 and the frequency changer 76 are shown twice in the communications satellite 10 simply to indicate that two paths exist, where the earth station 38 receives signals from the terminal 44 via the communications satellite 10 and the earth station 38 sends signals to the terminal 44 via the communications satellite 10.

Firstly, the earth station 38 sends a signal on the uplink 58 which is transposed by the frequency changer 76 and sent down on the terminal downlink 62 to the terminal 44. The terminal 44 makes a measurement of the signal on the terminal downlink 62, transposes its frequency by a nominal fixed amount and resends the transposed signal on the terminal uplink 64 to the communications satellite 10 via the subscriber antenna 42 to be transposed via the mixer 76 and sent, via the downlink radio link 60, to the earth station 38 where the earth station controller 56 makes an accurate frequency measurement. The terminal 44 also makes an independent transmission, via the communications satellite, as described, at a nominal frequency, known to the earth station 38 and its controller 56.

A moment of reflection will show that precisely the same method has been used by the earth station 38, extended via the 'calibrated' communications satellite 10, to measure the errors of the terminal 44, as the earth station 38 used to 'calibrate' the communications satellite. There has been one loop-back frequency measurement, and one independent signal at a nominal synthesised frequency. The earth station controller 56 corrects for the 'calibration' of the communications satellite, and once again works out the two equations in two unknowns to solve for the communications satellite 10 to terminal 44 Doppler shift and to solve for the proportional error in the master oscillator in the terminal 44.

Figure 10:
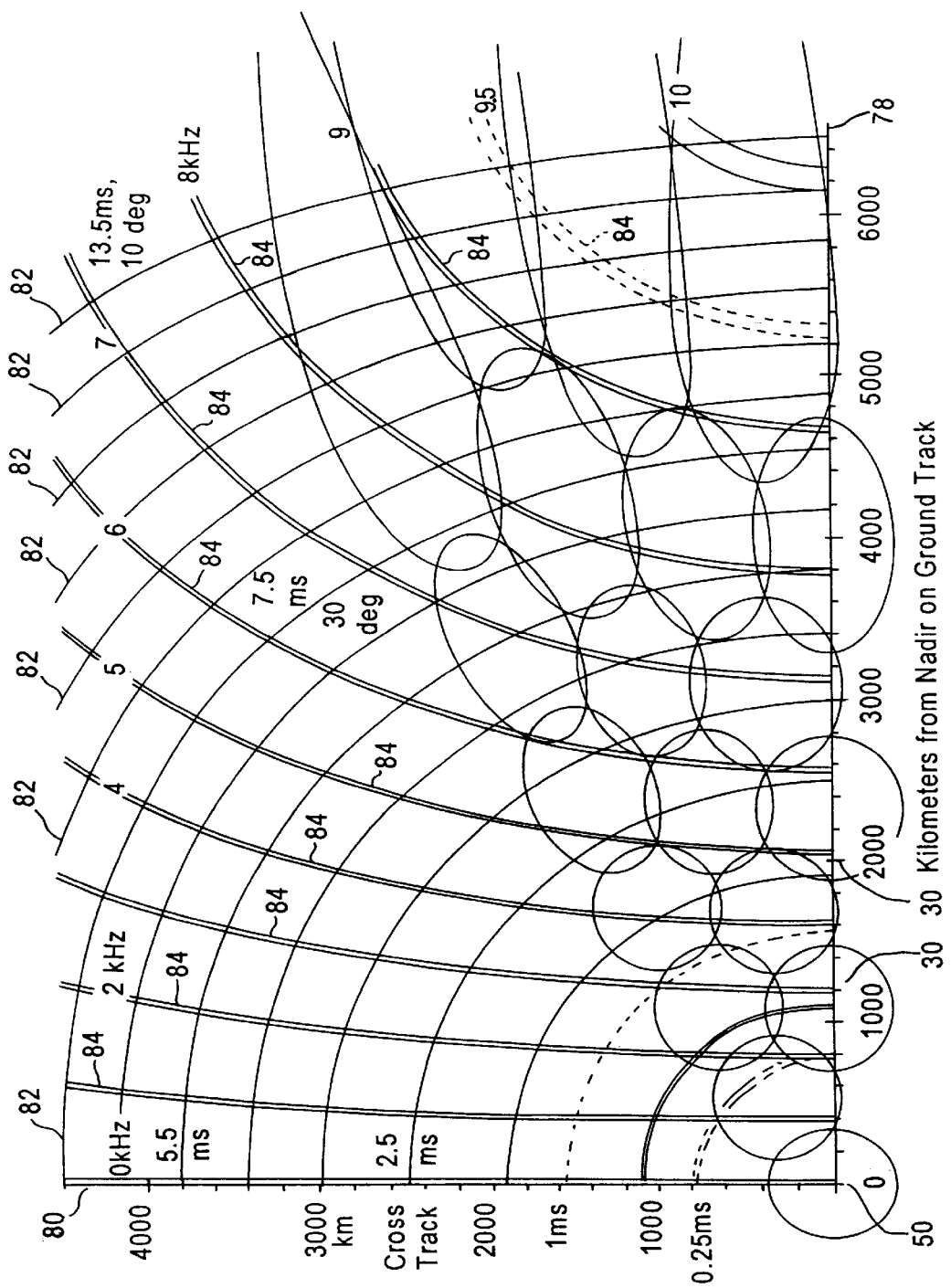
FIG. 10 shows how intersecting lines of measured Doppler frequency shift and propagation delays may be used to measure the position of the terminal on the surface of the earth.

FIG. 10 shows how measurement of Doppler frequency shift and delays can be used to locate a terminal 44 on the surface of the earth 14.

In FIG. 10, the horizontal axis 78 corresponds to measurement in the direction of the second arrow 48 of FIG. 5 along the ground track. The vertical axis 80 corresponds to measurement along the cross track as indicated by the fourth arrow 54 in FIG. 6.

Only one quadrant is shown. It is to be understood that the pattern, as shown, is symmetrical about the axes in all four quadrants.

The delay measurements, described with reference to FIG. 6, create a series of delay contours 82, approximating to circles centred on the nadir 50 which corresponds to the point 00 in FIG. 10. Whereas the delay contours 82 represent the intersections of spheres of constant delay centred on the communications satellite, Doppler contours 84 represent the lines of intersection of the plurality of coaxial cones 72 described in relation to FIG. 7. The Figures given for the Doppler contours relate to the Doppler shift, in milliseconds, corresponding to the position, on the surface of the earth 14, where the terminal 44 might be situated. Likewise, the Figures adjacent to the delay contours 82 indicate the particular delay in milliseconds, for that particular delay contour 82 and that was the particular position on the surface of the earth 14. Various Figures are shown in degrees, being the angle of elevation from the terminal 44 to the communications satellite 10 if it were in that location. FIG. 10 extends out to a minimum elevation of 10 degrees, which, in this instance, is the operational minimal of the communications satellite communications system which holds the example given as the preferred embodiment of the present invention.

Also shown in FIG. 10, overlaid, are some of the spot beams 30 described with reference to FIGS. 3 and 4. It is to be understood that spot beams 30 fill the entirety of the four quadrants. Only a few spot beams 30 have here been shown to avoid undue cluttering and complication of FIG. 10.

Essentially, on the basis of a single delay measurement as described with reference to FIG. 6, and a single Doppler frequency shift measurement as described with reference to FIGS. 8 and 9, it is possible to estimate the position of the terminal 44 on the surface of the earth 14 at that point where its particular delay contour 82 and Doppler contour 84 cross.

Because there exist 4 quadrants, there is a degree of ambiguity in determining which of the four quadrants the terminal 44 might be situated. This is resolved by noting which of the plurality of spot beams 30 received the signal from the terminal 44.

It is to be observed, in FIG. 10, that the Doppler contours 84 are in fact drawn as a pair of lines rather than a single line. This is to represent the proportional error in the measurement. Close to the nadir 50, the lines in the Doppler contour 84 are close together indicating a small positional error. By contrast, at large distances along the ground track shown by the horizontal axis 78, the pairs of lines in the Doppler contours 84 become wider apart indicating a greater error. By contrast, although the delay contours 82 are also pairs of lines indicating an uncertainty, in the accuracy of the measurement, the pairs of lines in the delay contours are much closer together.

In order to overcome the rather large errors in the Doppler contours 84 at great distances along the ground track as indicated by the horizontal likes of 78, an averaging process in undertaken.

Figure 11:
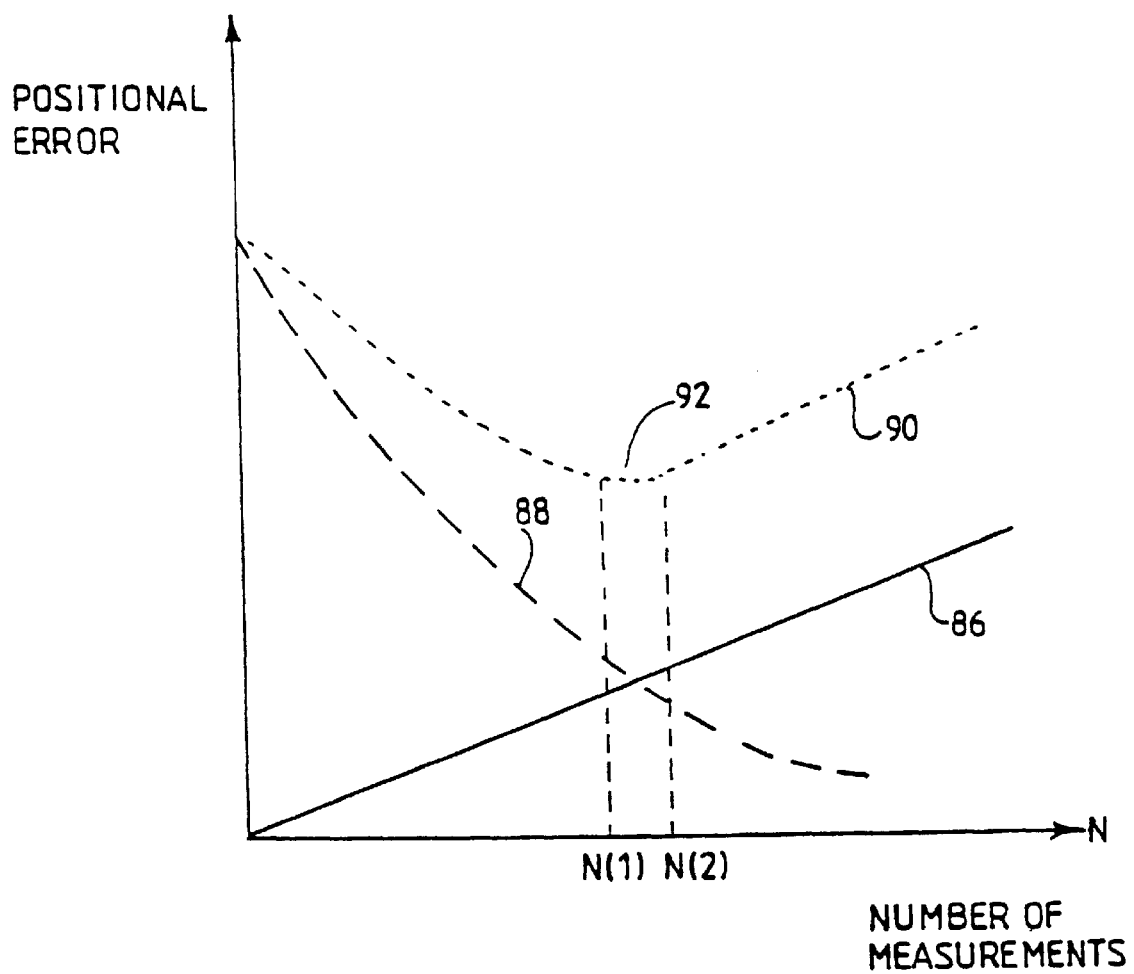
FIG. 11 is a graph showing the derivation of the optimal number of samples for best estimation of position.

FIG. 11 shows a surprising result. If no correction is made for the movement of the earth 14 relative to the nadir 50 of the communications satellite 10, or of the orbital velocity of the communications satellite 10 relative to the earth, the actual position of the terminal 44, as shown in FIG. 11, relative to the communications satellite 10, steadily increases with time as shown by the solid line 86. Each measurement of the Doppler shift and of the delay takes a predetermined period. Accordingly, the positional error as shown by the solid line 86 increases steadily with the number of measurements made.

The positional error, as measured, falls, by well known statistical principles, by the root of the sum of the squares. For example, if a hundred samples are taken, the average error falls to one tenth. If ten thousand samples are taken, the average error falls to one hundredth. If a million samples are taken, the average error falls to one thousandth, and so on. Broken line 88 indicates the falling rate of measured positional error against the number of samples.

The dotted line 90 represents the sum of the broken line 88 and the solid line 86 indicating the actual positional error against the number of samples. It is to be noted that there is a minimum region 92 where the measured positional error is at its least, fewer numbers of measurement producing a greater measured positional error, and greater numbers of measurements also producing a greater measured position error. It is to be observed that the minimum region 92 is quite flat and there are a range of values N(1) to N(2) between which the measured positional error is more or less at a minimum. An optimum number of numbers of measurements may thus be selected between the numbers N(1) and N(2) which will give the best positional estimation. The exact number of optimum measurements depends very much upon the initial measurement error. Returning, briefly, to FIG. 10, the slope of the broken line 88 representing the improvement of positional error in terms of the number of measurements taken, being a square root, it is to be observed that the delay contour lines 82 start off with a relatively small error so that, interpreting the graphs of FIG. 11, a relatively small number of measurements would be required to produce an optimum number of measurements. Conversely, the Doppler contours 84, along the ground track is indicated by the horizontal axis 78 are relatively large so that the slope of the broken line 88 is relatively shallow, demanding a relatively large number of measurements to achieve a best estimation of positional error.

Figure 12:
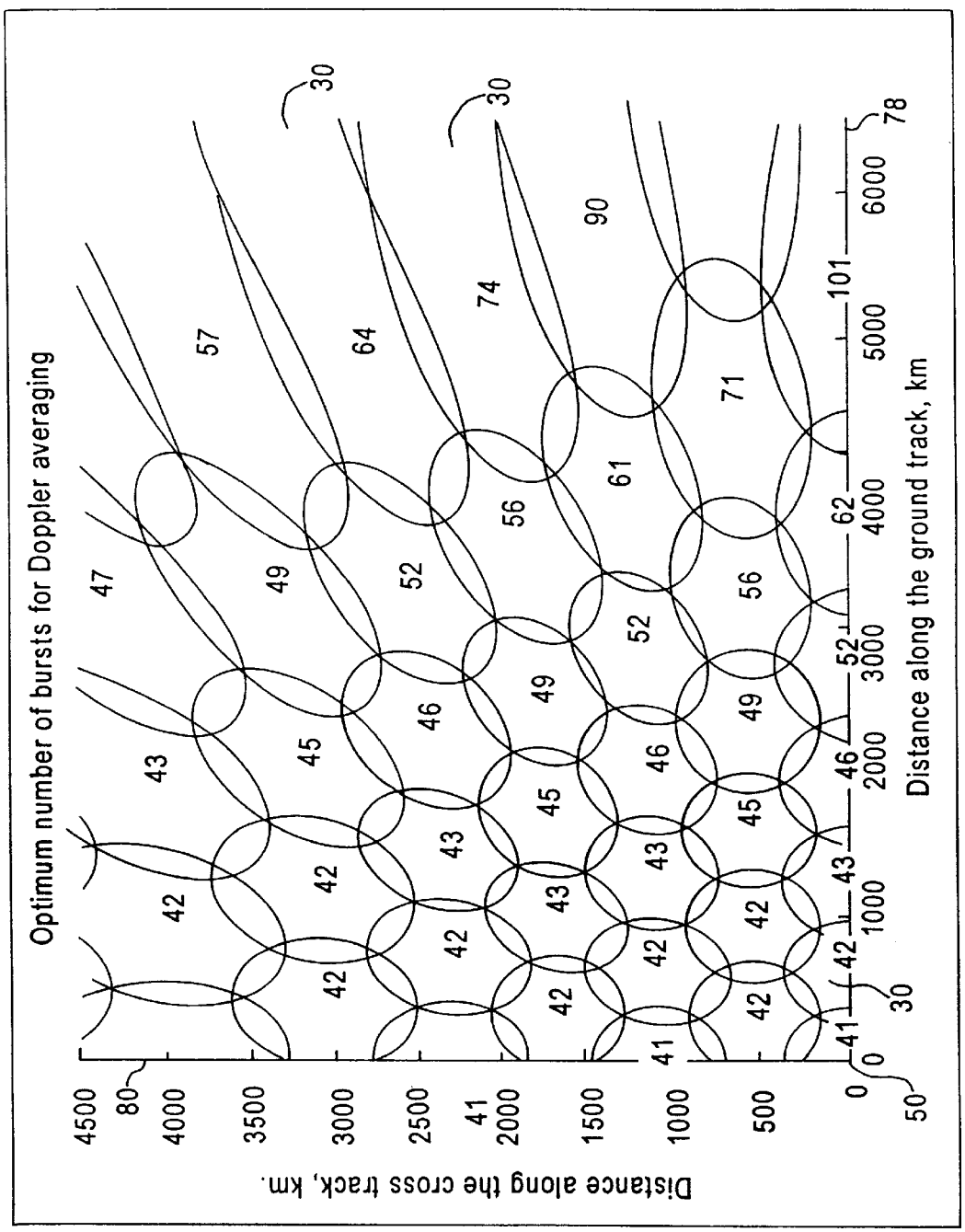
FIG. 12 is a chart showing, for the particular preferred embodiment, the derived optimal number of samples for Doppler frequency shift averaging.

FIG. 12 is a first quadrant indication of the optimal number of measurements to be taken for each of the spot beams 30 depending upon the beam in which the terminal 44 is found, for each of these spot beams 30, for Doppler shift measurements, according to the preferred embodiment illustrating the present invention. It will be seen that numbers of optimum measurements range from 90 to 42. If other sampling rates and communications satellite orbital heights are chosen, other optimum numbers of measurement apply.

Figure 13:
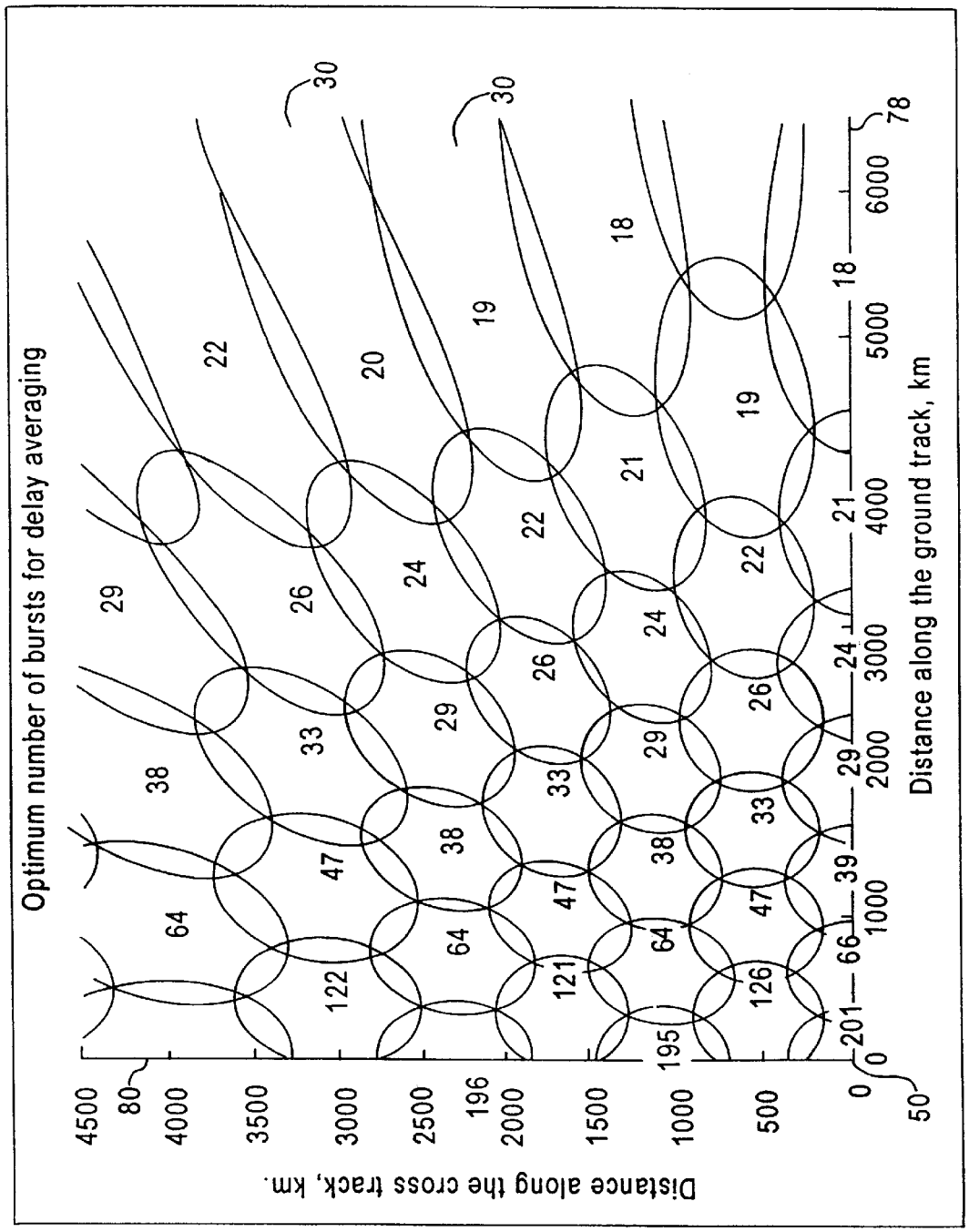
FIG. 13 is a chart showing, for the particular preferred embodiment, the derived optimal number of samples for propagation delay averaging.

Likewise, FIG. 13 shows the optimum number of bursts or samples for each of the spot beams 30 for delay measurements as described with reference to FIG. 6. Surprisingly, the optimum number of samples ranges from 201 near the nadir along the cross track as indicated by the vertical lines 80 and drops to surprising low values at the periphery of the spot beams 30.

The foregoing description applies to those areas 18, as shown in FIGS. 1 and 4, as having single radio coverage from a communications satellite 10. The following description applies to those areas 20, shown in FIGS. 1 and 4, where there is multiple radio coverage from the communications satellite 10.

Figure 14:
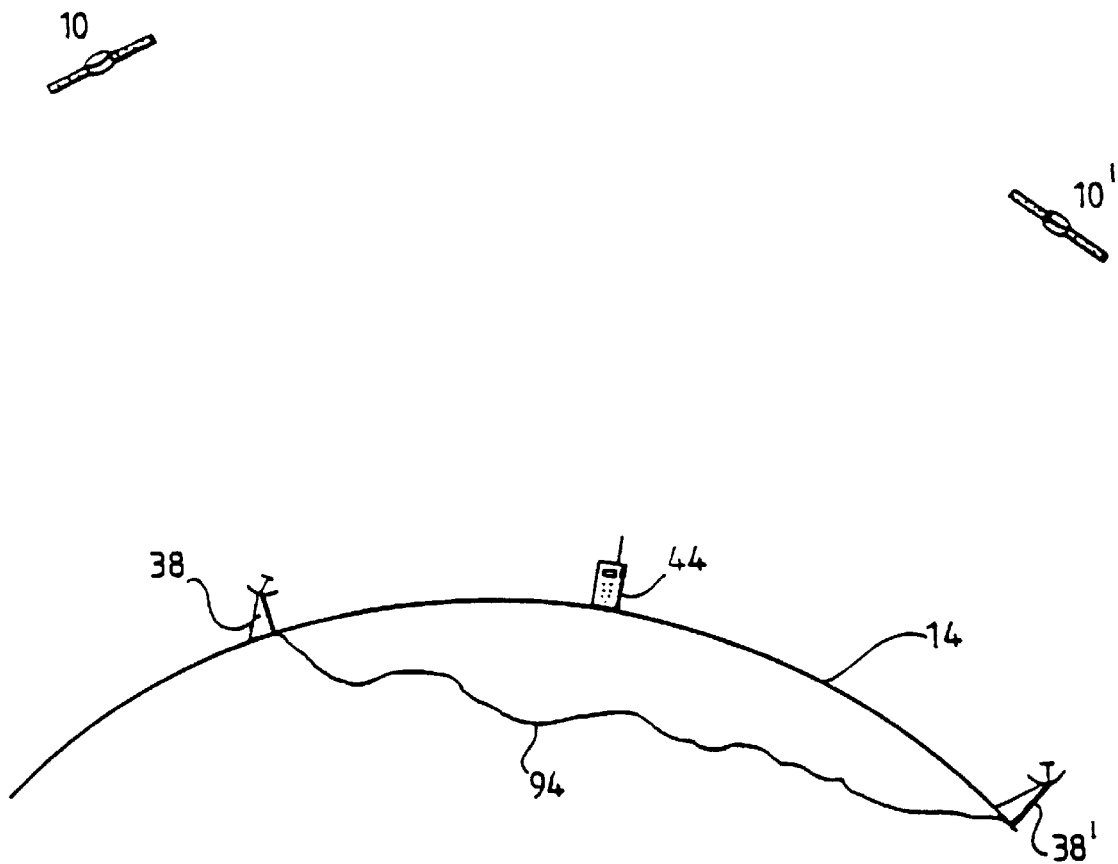
FIG. 14 shows the situation where the terminal has direct access to more than one communications satellite.

FIG. 14 shows the situation where the terminal 44, on the surface of the earth 14, has radio coverage from more than one communications satellite 10 10'. Ideally, the two communications satellites 10 10' should both be visible to the terminal 44 and to a single earth station 38. However, it is possible that a communications satellite 10' may be visible of the terminal 44 but not the single earth station 38. Alternatively, the other communications satellite 10' will be visible to another earth station 38'. This is not a problem since both earth stations 38 38' may be joined by a ground communication line 94 where data, derived from the communications satellite 10 10' and the terminal may be exchanged for one of the earth stations 38 to act as a master in determining the position of the terminal 44 on the surface of the earth 14.

If more than one communications satellite 10 10' is visible, or has been visible in the near past, instead of executing a Doppler ranging operation as described with reference to FIGS. 7, 8, 9, 10, 11 and 12, a simple time delay measurement is executed as described with reference to FIGS. 6, 10, 11 and 13. An earth station 38 38' sends a signal to each of the communications satellites 10 10' and, as previously described, and measures the propagation delay between the communications satellite 10 10' and the terminal 44.

As earlier described with reference to FIG. 6, the delay measurements generate, as the possible position of the terminal 44 relative to the communications satellite 10, a spherical surface, centred on each of the communications satellites 10 10' which intersect with each other, and with the surface of the earth 14, to give a unique location for the terminal 44 on the surface of the earth 14, subject to beam identity ambiguity resolution, hereinbefore described. If the terminal is assumed to be on the surface of the earth, only two communications satellite propagation delays are necessary for absolute location of the terminal. If more than 3 communications satellites 10 10' are so used, the terminal 44 may be absolutely located in space, also allowing for altitude variations on the surface of the earth 14. It is to be noted, with reference to the description of FIG. 10, that the delay contours 82 are considerably more accurate, particularly at extreme range from the nadir 50 along the ground track as indicated by the horizontal lines of 78, than are the Doppler contours 84. Accordingly, the method of measurement of the position of the terminal 44 on the surface of the earth 14 describe with reference to FIG. 14 is more accurate.

Accordingly, the embodiment of the invention initially concerns itself with, in what manner, the position of the terminal 44 is to be determined on the surface of the earth 14 using one or more communications satellites 10 10'. Where only one communications satellite 10 is visible, the ranging method shown in FIG. 10 is employed. When more than one communications satellite is visible, the position determined method described in relation to FIG. 14 is employed. These techniques are used, initially, to gain a rough estimation of the position of the terminal 44.

Figure 15:
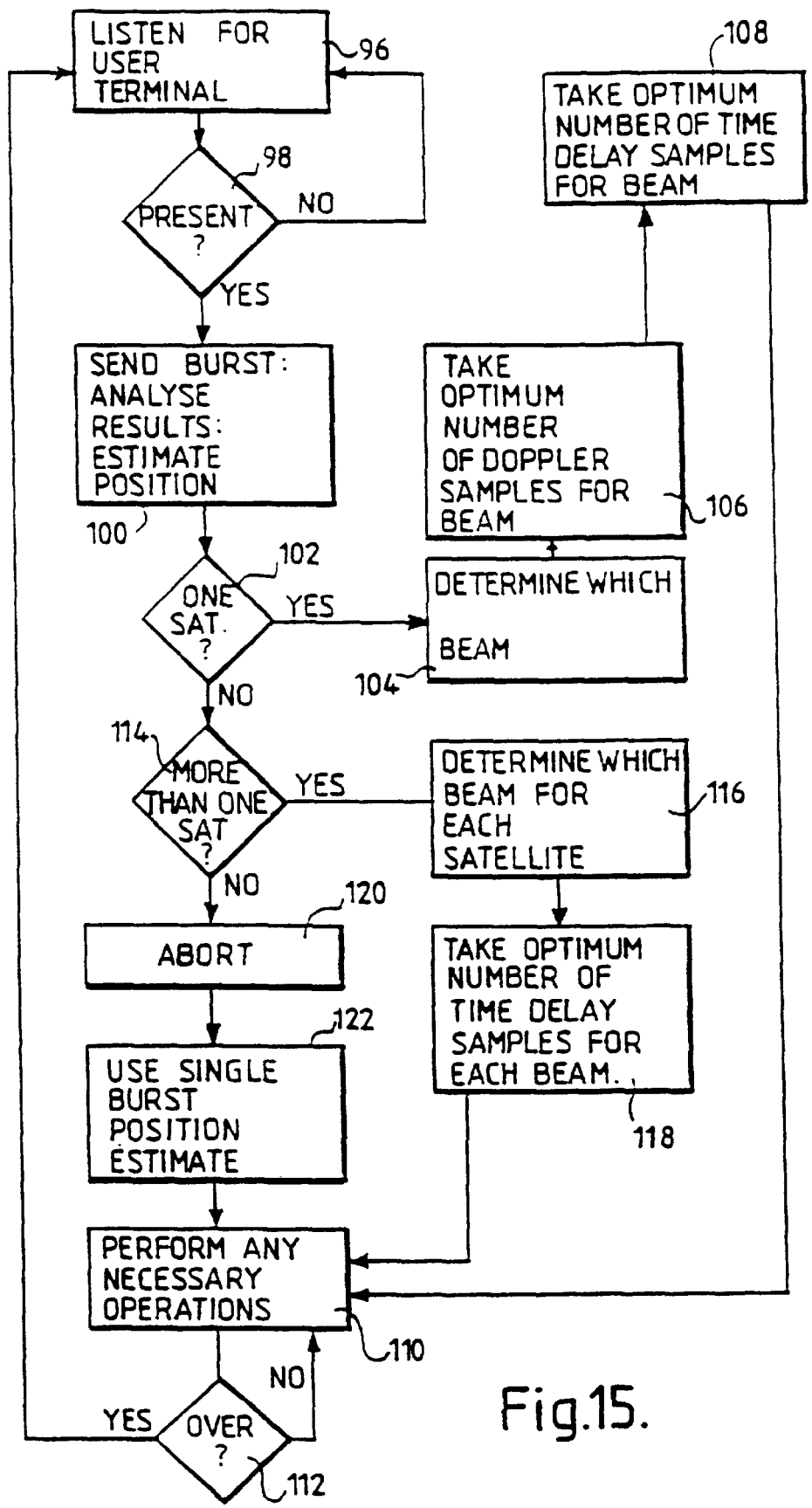
FIG. 15 is a flow chart of the activities of the earth station when determining the position of the terminal on the surface of the earth employing one communications satellite, or more than one communications satellite, if available.

Attention is now drawn to FIG. 15 which shows the activity of the earth station controller 56 in that one of the earth stations 38 38' which executes the rough estimation position determination for the terminal 44 using the communications satellite 10 10'.

In a first operation 96 the earth station 98 listens for a request of some kind of the terminal 44. If a first test 98 fails to detect a call from the terminal 44, control is passed back to the first operation 96. If the first test 98 determines that the earth station 38 has been polled by the terminal 44, control is passed to a second operation 98. The second operation 98 sends a transmission, via the communications satellite 10, to the terminal 44 as described with reference to FIG. 6, 9 and 10. It is to be presumed that the operation of FIG. 8, where the communications satellite is "calibrated", has already been executed. If the operation described with reference to FIG. 8 has not been executed, the second operation 100 executes the necessary calibration of the communications satellite 10.

The second operation 100 also analyses the results from the Doppler frequency shift measurement and from the time delay measurement based on one mutual transmission between the earth station 38 and the terminal 44 to give a guess as to the position of the terminal 44 on the surface of the earth 44.

The earth station 38, having made an approximate estimate of the position of the terminal 44, on the surface of the earth, is then in a position to determine whether or not the terminal 44 will be visible to more than one communications satellite 10. If a second test 102 decides that only one communications satellite is visible, control passes to a third operation 104 which determines which one out of the plurality of spot beams 30 is occupied by the terminal 44. This information may also be known by the earth station 38 based on which of the spot beams 30 the signal from the terminal 44 was received.

Control passes from the third operation 104 to a fourth operation 106 where, with reference to FIG. 12 on its associated description, depending upon which spot beam 30 is occupied by the terminal 44, the optimum number of samples by message exchange is executed. This gives the greatest provision in position determination as described with reference to FIG. 11.

When the fourth operation 106 has performed its necessary function, control passes to a fifth operation 108 where delay measurements are made, as described with reference to FIG. 6, for the optimum number of samples for delay measurement as described with reference to FIGS. 11 and 14.

The fourth 106 and fifth operations 108 may be conducted simultaneously, the number of sampling instance being the larger of which ever is greater for Doppler shift or delay measurement as shown as reference to FIGS. 12 and 13 for a particular spot beam 30, and the result being analysed for the lesser number only up to the smaller number required, later results being discarded.

The sum of the function of the fourth operation 106 and the fifth operation 108 is to give the best estimate, based on the style of position analysis described with reference to FIG. 10 where spheres of constant time delay and cones of constant Doppler shift intersect the surface of the earth 14.

At termination of the fifth operation 108, control is passed to a sixth operation 110 where any necessary communications operation is executed. This may comprise a telephone call, a request for updating of position and status, or whatever else may be required. If a third test 112 depicts that the necessary operation of the sixth operation 110 is terminated, control returns to the first operation 96 where the earth station 38 once again listens for the terminal 44 through the communications satellite 10.

Returning to the second test 102, it has been detected that there is just not a single communications satellite 10, control is passed to a fourth test 114 which determines if there is more than one communications satellite 10 10' present. If the fourth test 114 detects that there is a plurality of communications satellites 10 10' available, control passes to a seventh operation 116 where the earth station 38, via the earth station controller 56, determines for which of the plurality of spot beams 30 for each communications satellite the terminal 44 is accessible. Thereafter, control passes to an eighth operation 118 where the earth station 38 exchanges the optimum number of radio bursts for each communications satellite 10 according to FIG. 6 and its associated description, and according to FIGS. 10 and 13 and their associated descriptions. Once the position of the terminal 44 has been approximately determined by the eighth operation 118, control passes to the sixth operation 110 and thereafter as earlier described, back to the first operation 96.

If the fourth test 114 finds no communications satellites available, an unusual situation but none the less possible due to environmental blockage, control passes to a ninth operation 120 where the overall operation is aborted. Control then passes to a tenth operation where the earth station 38 assumes the rough position of the terminal 44 based on the single burst Doppler shift and delay measurements executed in the second operation 100.

After the tenth operation 122, control passes to the sixth operation 110 which performs any necessary operations, which, in this instance, might be for the earth station 38 to attempt to establish contact with the terminal 44, or, perhaps, even to do nothing.

Control then passes back to the first operation 96.

Figure 16:
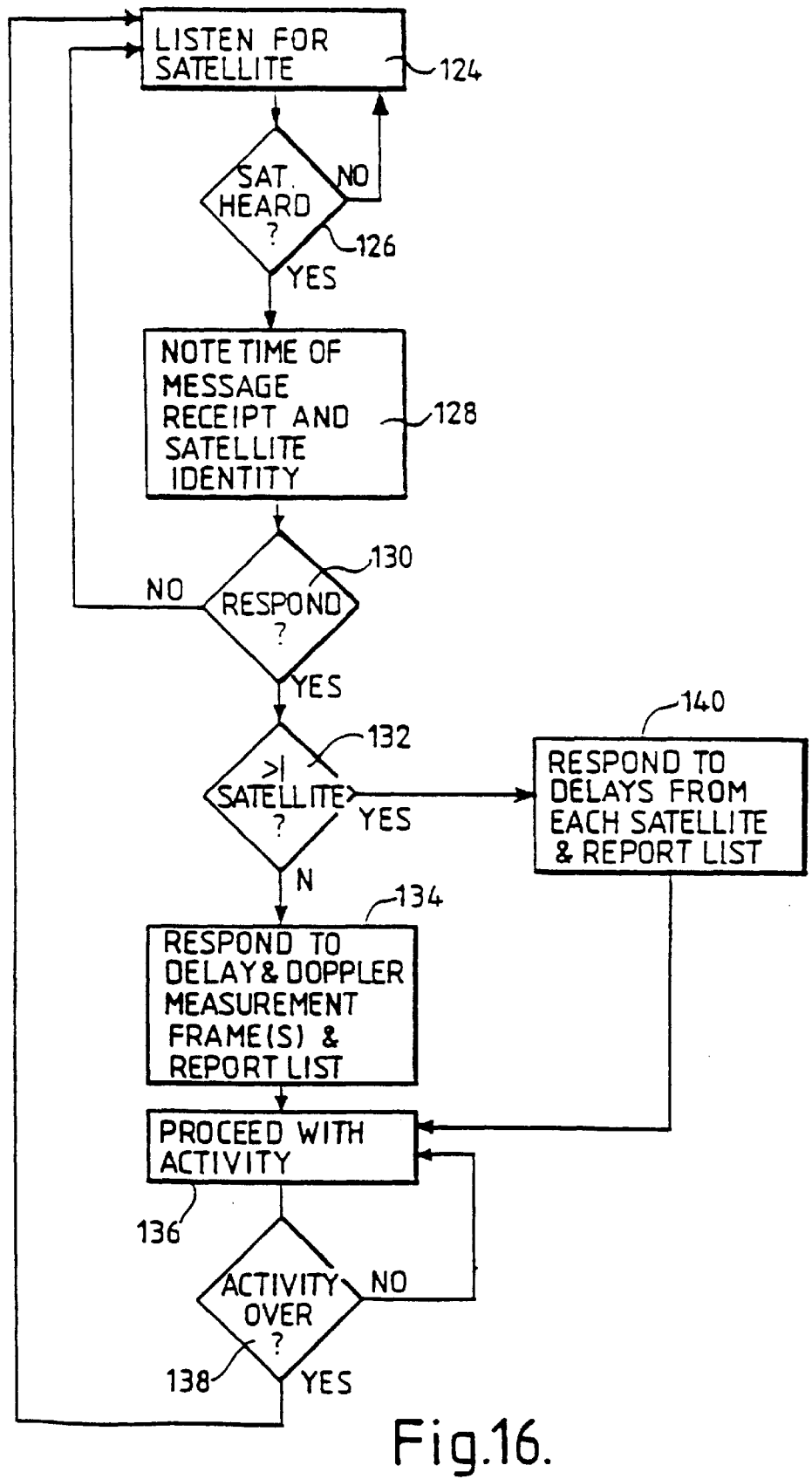
FIG. 16 is a flow chart showing how the earth station can incorporate timed broadcasts in determining the position of the terminal on the surface of the earth.

FIG. 16 shows the activity of the terminal 44 as it co-operates with the earth station 38 in yet a further alternative for locating the terminal 44 in the surface of the earth 14.

The individual communications satellites 10, at periodical intervals, send out broadcast messages, on all of the spot beams 30, intended to be received by all terminals 44. The broadcast message, from each communications satellite, originates originally, from an earth station 38 and contains information which identifies from which communications satellite the broadcast message is emanated. The time of transmission of the broadcast message is accurately known because, as described with reference to FIG. 6, the earth station 38 is aware of the precise distance between itself and the communications satellite 10. Equally, as shown in FIG. 14, different earth stations 38' can instruct different communications satellites 10' to provide a broadcast message. Each earth station 38' is aware of the position of the communications satellite 10 at all times and will also be aware of the identity of the earth station 38 38' from which the broadcast message originated. As an alternative, the broadcast message can also include indication from which earth station it originated.

In any event, it is merely necessary to note the time of arrival of a broadcast message at a terminal 44, and to know from which communications satellite 10 it originated, in order, effectively, to do a ranging "propagation delay" measurement on the terminal 44 from the communications satellite 10. Once again, a sphere of fixed delay, in terms of distance, describes the potential locus of the terminal 44 about the central communications satellite 10, and the terminal 44 can lie on the line of intersection of the sphere centred on the communications satellite 10, with the surface of the earth 14.

Returning once again to FIG. 16, the terminal, in an 11th operation 124, listens for the broadcast messages from the communications satellites 10 until a fifth test 126 detects that a communications satellite has been heard. Control then passes to a 12th operation 128 where the terminal, using an internal clock, notes and stores the instant of receipt of the message from the communications satellite 10 together with the identity of the particular communications satellite 10 from which the message originated. The terminal 44 keeps a record of the last several communications satellites 10 to be heard.

Control then passes to a sixth test 130 which checks to see if the terminal 44 is required to respond to the communications satellite 10. If no response is required, control passes back to the 11th operation 124 where the terminal once again listens for broadcast messages from the communications satellite 10.

If the sixth test 130 determines that the terminal 44 is required to respond in some manner, perhaps for communications or registration purposes, control passes to a seventh test 132 which checks to see if only one communications satellite 10 is visible, or more than one communications satellite 10 is visible. This can be established from the list compiled in the 12th operation 128.

If the seventh test 132 detects that there is only one communications satellite visible, control passes to a thirteenth operation 134 where the terminal 44 responds to delay and Doppler measurements as indicated with reference to FIGS. 6 to 13. The terminal 44 also sends, to the earth station 38 the list of times and identities of heard communications satellites 10 which was accumulated by the 12th operation 128.

The earth station controller 56 then combines all of these measurements and will know the position of the terminal 44 on the surface of the earth 14. Control next passes to a fourteenth operation 136 where the terminal 44 proceeds with whatever activity is required of it, which, as will later be described, can include message receipt from one or more of a plurality of navigational satellites, and establishment and execution of phone calls, until an eighth test 138 detects that the activity is over and passes control back to the eleventh operation 124 where the terminal 44 listens for messages from the communications satellites 10.

If the seventh test 132 detects that more than one communications satellite present, control passes to a fifteenth activity 140 where the terminal 44 responds to a propagation delay measurement from each of the communications satellites 10 10' as described with reference to FIGS. 14 and 15. The terminal 44 also reports, to the earth station 38, the contents of the list accumulated in the twelfth operation 128 during the time of receipt and identity of communications satellite broadcast messages.

At this point, the earth station 38 with which the terminal 44 is interactive will have sufficient information to determine the position of the terminal 44 along the surface of the earth 14.

The fifteenth activity 140 having being completed, control passes to the fourteenth activity 136 which proceeds with whatever activity the terminal is required to perform and then, via the eighth test 138, returns control to the eleventh operation 124 where the terminal 44 continues to listen to broadcast messages from communications satellites 10.

It is to be noted that, if there are sufficient readings listed by the twelfth operation 128 and the terminal 44 has not been moving any significant distance over time, then the position of the terminal 44 on the surface of the earth 14, may adequately and accurately be measured simply on the basis of the record accumulated by the twelfth operation 128 thus dispensing with the necessity in the fifteenth activity 140 to measure delays from each visible communications satellite or, in the thirteenth activity 134 to perform a Doppler measurement together with a delay measurement.

Equally, in the thirteenth activity 134, if the combined propagation delay and Doppler frequency shift measurement produces a location which roughly corresponds to the location resulting from intersection of the spheres of constant delay as determined from the list of broadcast receipt times and communications satellite identities as collected by the twelfth operation 128, and this latter determination is more accurate, then the earth station 38, through its earth station controller 56, can opt to use the latter determination.

Another extremely significant element of the compilation of the list by the twelfth operation 128 and its being reported by the thirteenth operation 134 and the fifteenth activity 140 is very simply that the position of the terminal 44 on the surface of the earth, can be measured using communications satellites 10 which are no longer visible to the terminal 44. This is in contrast to all other methods which require that a communications satellite 10, used for a position determination, should be visible to the terminal 44.

The terminal 44 comprises an internal clock. This clock, of course, has relative inaccuracies. The earth station 38, in combination with the earth station controller 56, possess a very accurate clock. In order for the earth station 38 properly to use the list gathered by the 12th operation 128, it is necessary to correct the errors in the clock on the terminal. This is very simply done. The earth station 38, at a first known instant, requests the terminal 44 to indicate the time, on its clock to the earth station 38. The earth station 38 knows the propagation delay between itself and the terminal 44. The time of response, by the terminal 44, is thus very accurately known. Having noted what time the terminal clock believes it to be, the earth station 38 and the earth station controller 56 wait for a predetermined period, perhaps one second, and request that the terminal 44 once again tells the earth station 38 what time the terminal thinks it is. The earth station 38 thus has two readings from which the rate of drift of the clock on the terminal 44 and the accumulated timing error can be determined. The earth station 38, with the earth station controller 56, can thus extrapolate using the known drifts and errors, the times recorded in the list generated by the twelfth operation 128. The corrected times are then compared with the known times of transmission from each communications satellite 10 of the particular broadcast messages. The earth station controller 56 can then calculate the propagation delay between each communications satellite and the terminal. Since the position of each communications satellite is accurately known, it is possible to determine the range of the terminal 44 from the particular communications satellite which did the broadcasting.

The previously described measures can be used singly, multiply or in any combination to determine the approximate location of the terminal 44 on the surface of the earth 14. If two communications satellites are visible, the embodiment of the present invention also includes the possibility of using a Doppler frequency shift measurement from each of the communications satellites to determine the position of the terminal 44.

Thus far, the description of the invention has been restricted to the initial phase where the communications satellite 10 or satellites 10 10' have been used to make an estimate of the position of the terminal 44. The following description now passes the manner in which information, received by the terminal 44 from one or more of a plurality of navigational satellites, is used significantly to enhance the accuracy of the determination of the position of the terminal 44 on the surface of the earth 14.

To this point, the description of the invention has been limited to that element thereof which employs communication satellites for the purpose of measuring the position of the terminal 44 on the surface of the earth 14. The following description relates to that element of the invention which incorporates other delay measurements to obtain, under no matter what circumstances, the best estimate of the position of the terminal 44 on the surface of the earth 14.

Figure 17:
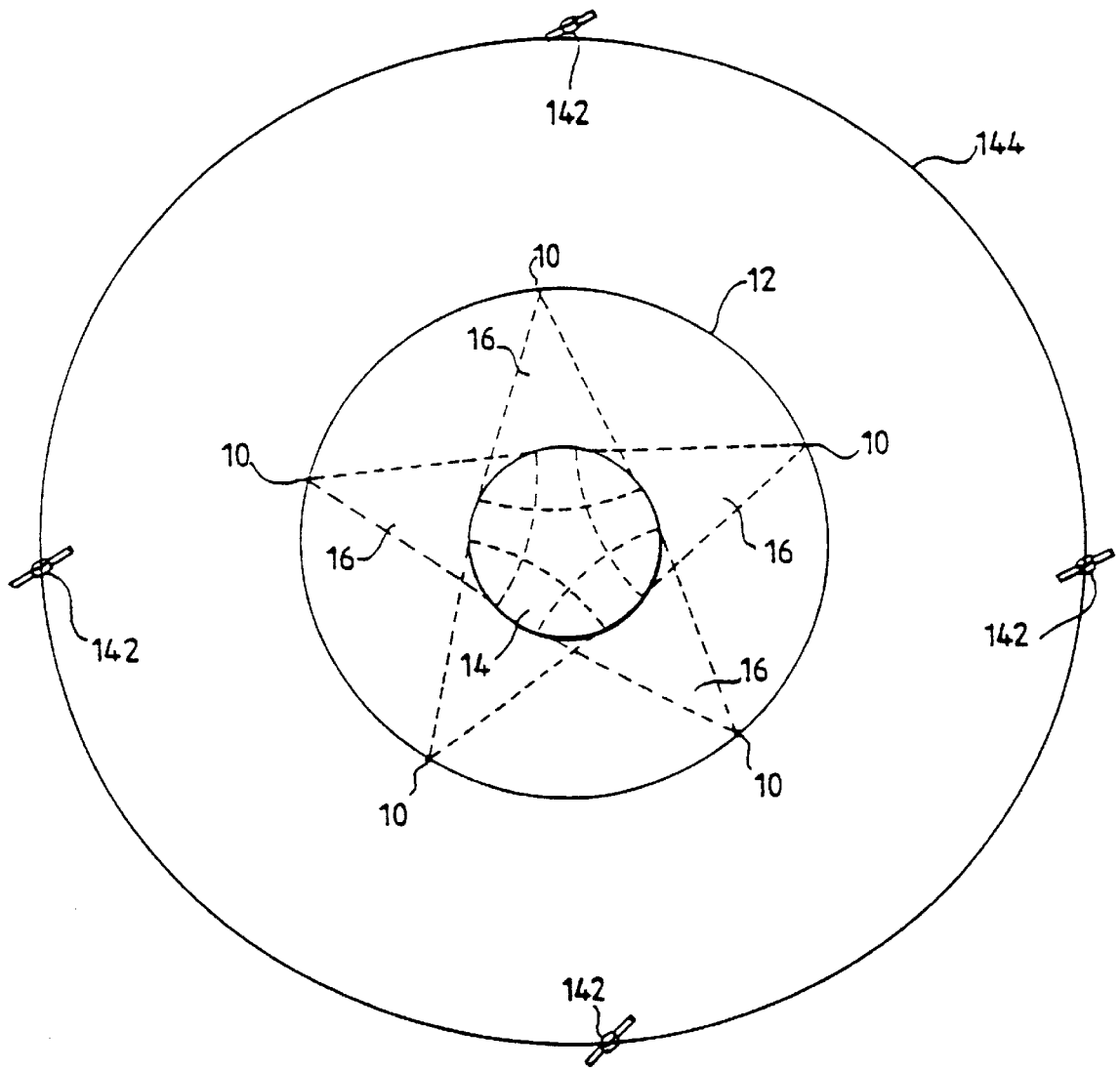
FIG. 17 is an expansion of FIG. 1 wherein the communications satellites are shown in their relationship to navigational or positioning satellites.

FIG. 17 is an expansion upon FIG. 1. Communications satellites 10 are disposed in an orbit 12 about the earth 14 giving cones 16 a radio coverage. Members of an extra constellation of navigational satellites 142 are disposed of in another orbit 144 about the earth 14.

The navigational satellites 142, chosen to illustrate this element of the present invention, are selected to be those employed in the global positioning system (GPS) provided by Navstar and as described in their service and signal specification published, in its second edition, on Jun. 2nd 1995. In this system, the constellation comprises 24 navigational satellites 142 disposed in six orbits 144, around the earth 14, there being 4 satellites 142 in each orbit 144 and each of the orbits 144 being inclined to the equator at an angle of 55 degrees.

As will come apparent from the following description, this particular system is just one example of the manner in which the present invention can be implemented. All that is required to practise the present invention is a source 142 in a known position is capable of making a transmission at a known time.

The another orbit 144 given in this example, is at approximately 20 thousand kilometres from the surface of the earth 14 and allows the navigational satellites 142 to circle the earth in 12 hours. Again, it will be apparent that navigational satellites 142 may be employed in orbits of any height for the embodiment of the present invention to function.

Figure 18:
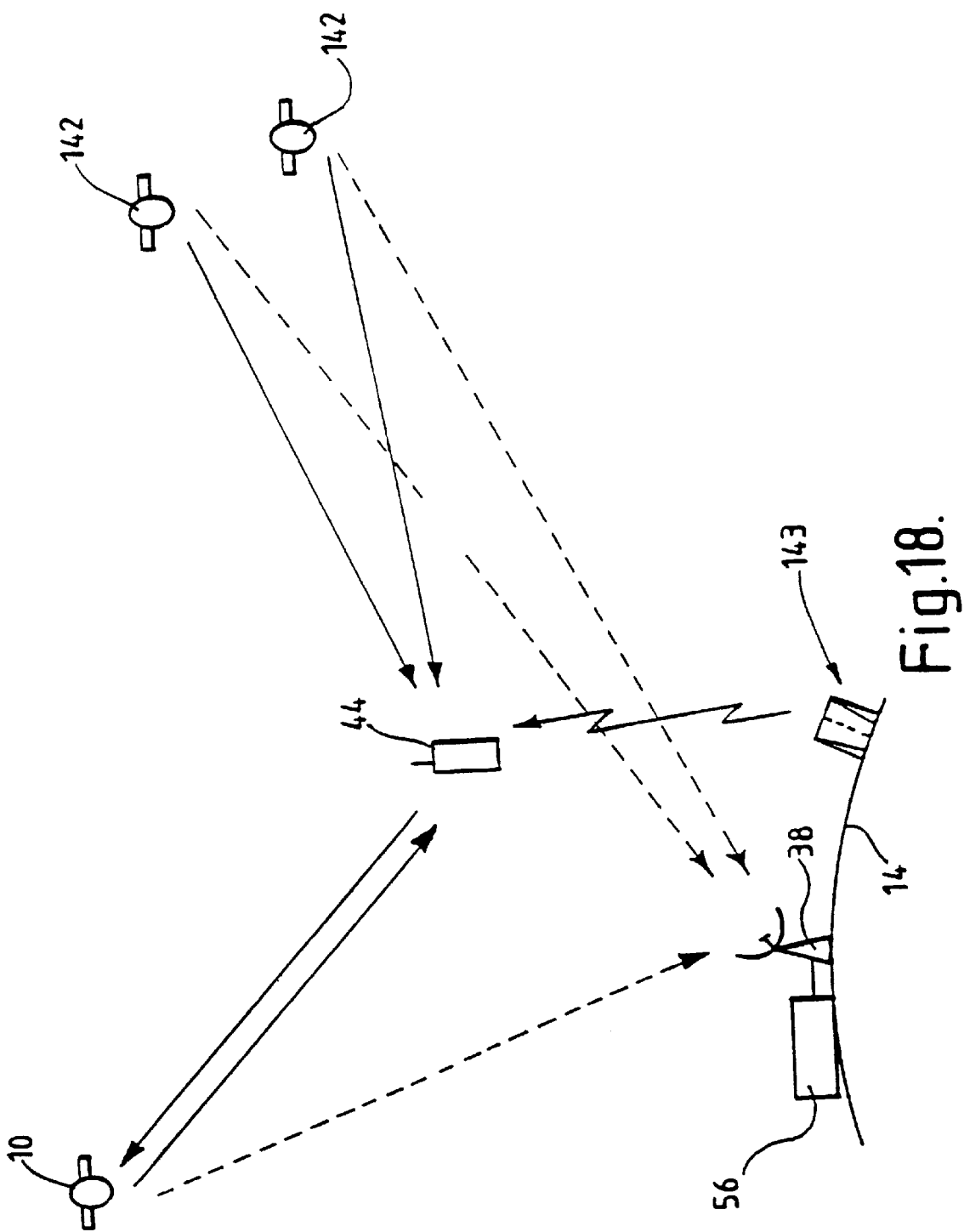
FIG. 18 is a schematic diagram showing the total environment of the present invention.

FIG. 18 is a schematic diagram illustrating the environment in which the present invention is practised.

The terminal 44 is in contact with one or more communication satellites 10 which, in turn, are in contact with the earth station 38 and its associated earth station controller 56. The interactions, therebetween, have already been described.

In addition, the terminal 44 is operative to receive transmissions from navigational satellites 142. The terminal 44 is operative to relay information concerning transmissions from the navigational satellites 142 to the earth station 38 and its associated control of 56. The earth station 38 is also aware of the orbital positions and behaviour of the navigational satellites 142 either by direct transmission or by prior knowledge of the system of the navigational satellites 142 in their constellation.

While two navigational satellites 142 have been shown in FIG. 18, it is to be understood that the terminal 44 may, at any instant, be unable to see any navigational satellites 142, just one navigational satellite 142, or many navigational satellites 142 at the same time. The situation shown in FIG. 18 is not restrictive.

As a variation on the theme of receiving a signal from a known source in a known position, transmitted at a known time, the terminal 44 can, in place of the navigational satellites 142, instead employ a fixed service radio station 143, at a known position on the surface of the earth. Such stations provide a low frequency signal giving the time of the transmission and are used, among other applications, for running self-adjusting clocks. The low frequency signal, typically in the range 10 khz to 100 khz, is ducted across the surface of the earth 14 rather than reflected from the ionised layers of the atmosphere. Because of this, the propagation speed of the low frequency radio wave is known and the distance from the fixed radio station 143 can be measured by measuring the delay in receipt of its time signal.

Again, as a variation on the navigational satellites 142, in the embodiment of the invention the GPS satellites 142 can be replaced by any other navigational satellites. In particular, there is an alternative navigational satellite system, provided by the former USSR (now the Russian federation), which can be used in exactly the same manner as hereinafter described. All that is required is simply that the satellites 142 have known orbits and transmit signals, to be picked up by the terminal, at a known or determinable time.

As a further variation on the theme of the navigational satellites 142, it is not even necessary that the navigational satellites 142 be navigational satellites. Other satellite communications systems do and will exist. Each communications system has satellites whose orbital parameters which can be known or measured by the earth station 38 56. Satellite communications systems periodically poll or interrogate terminals or other equipment on the ground 14. It is simply necessary for the terminal 44 of the present invention to detect a polling signal or other transmission from an alternative satellite communications system, and for the earth station 38 56 to know the time of the transmission and the position of the source, for the present invention to be practised using signals from an alternative satellite communications system. Such alternative satellites are characterised by being in a different constellation from the communications satellites 10 10' of the present invention, which definition covers all forms of satellites 142 which can be used by the present invention.

All of the sources 142 143 of navigational signals hereinbefore and hereinafter described are autonomous. That is to say, the time and nature of the signal they send is not under any form of control from the earth station 38 56 or the terminal. This is in contrast to the signals exchanged between the terminal 44 and the earth station 38 via the communications satellite 10.

For the purpose of clarity, an autonomous source of signals is hereinbefore and hereinafter defined as a source of signals whose signal content and time of sending signals is not under any control from either the terminal or the earth station.

Figure 19:
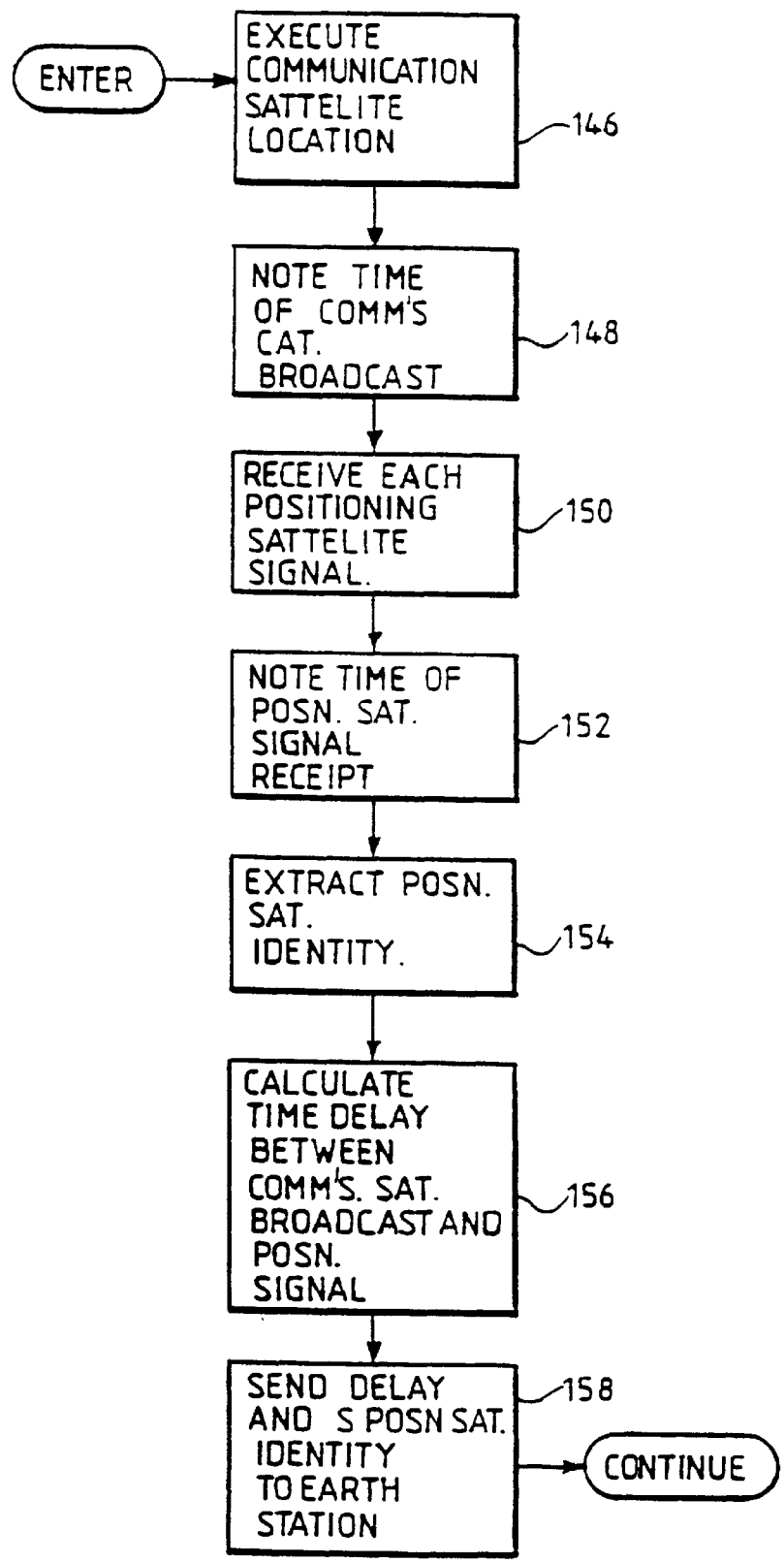
FIG. 19 is a flow chart of the activities of the terminal in the overall scheme of the present invention.

FIG. 19 shows a flow chart of the activity of the terminal 44 within the scope of the present invention.

Entry is to a sixteenth activity 146 which corresponds to the activities otherwise shown in the flow charts of FIGS. 15 and 16. In this manner, an approximate estimation is made of the position of the terminal 44 on the surface of the earth. If there is only one communication satellite 10 visible to the terminal 44, the combination of a delay measurement and a Doppler shift measurement are used to estimate the position of the terminal 44. If more than one communication satellite 10 is available, a combination of propagation delays between the terminal 44 and the communications satellite 10 is used.

The terminal, as described in FIG. 19, co-operates with the earth station 38 and its associated controller 56 to achieve the measurements hereinbefore described.

Having estimated the position the terminal 44, on the surface of the earth 14, control passes to a seventeenth activity 148 where the terminal 44, listening to the communications satellite 10, notes the time that a broadcast transmission is received from the earth station 38. It is to be understood that, under normal circumstances, the clock, within the terminal, is well below any standard of accuracy necessary to make any meaningful measurement with navigational satellites 142. However, the present invention provides that even a poor quality clock in the terminal 44 may be used in combination with signals from navigational satellites 142 to achieve realistic results when interacting with navigational satellites 142.

The seventeenth activity 148, by noting the time of receipt of the broadcast from the earth station 138, makes a bench mark for further measurements.

Control then passes to an eighteenth activity 150 where the terminal 44 listens for signals from any navigational satellite 142 which may be within range. As earlier stated, perhaps no navigational satellite 142 is within range. Alternatively, perhaps many navigational satellites 142 can be heard.

Control passes to a nineteenth activity 152 where, in the event of the terminal 44 hearing a signal from a navigational satellite 142, the terminal using its own internal clock, notes the time at which the signal from the navigational satellite 142 was received.

Control then passes to a twentieth activity 154 where the terminal 44 extracts the very minimum information from the signal from the navigational satellite 142, namely the identity of the particular navigational satellite of 142 of which the satellite was received Control then passes to a twenty-first activity 156 where the terminal 44 calculates the elapsed time, otherwise the time delay, between receipt of the communications satellite broadcast, executed in the seventeenth activity 148 and the noted time of receipt of the signal from the navigational satellite 142. Although the clock in the terminal is inherently of poor regulation, because differences are merely a secondary effect, the error in measuring the time delay in the receipt of the broadcast in the seventeenth activity 148 and the time of navigational satellites 142 signal receipt in the nineteenth activity 152 is very small. These are simply second order effects. By starting a timing operation on receipt of the broadcast message from the earth station 38, and by ending the timing operation when the signal from the navigational satellite 142 is received, and noting the elapsed time between the two events, the terminal 44 creates a record which is meaningful to the earth station 38 and its controller 56 and which the earth station 38 56 can use, together with the knowledge of the propagation delay, via the communications satellite 10, between the terminal 44 and the earth station 38, and, at the earth station 38, an accurate knowledge of the real time, to determine, with considerable accuracy, the instant at which the signal, from the navigational satellite 142, arrived at the terminal 44.

Control then passes to a twenty-second activity 158 where the terminal 44 sends, via the communication satellite 10, to the earth station 38 and its associated control of 56, the identity of the particular navigational satellite 142 from which a signal was received together with the measured elapsed time delay for that navigational satellite 142 which the terminal has identified.

Figure 20:
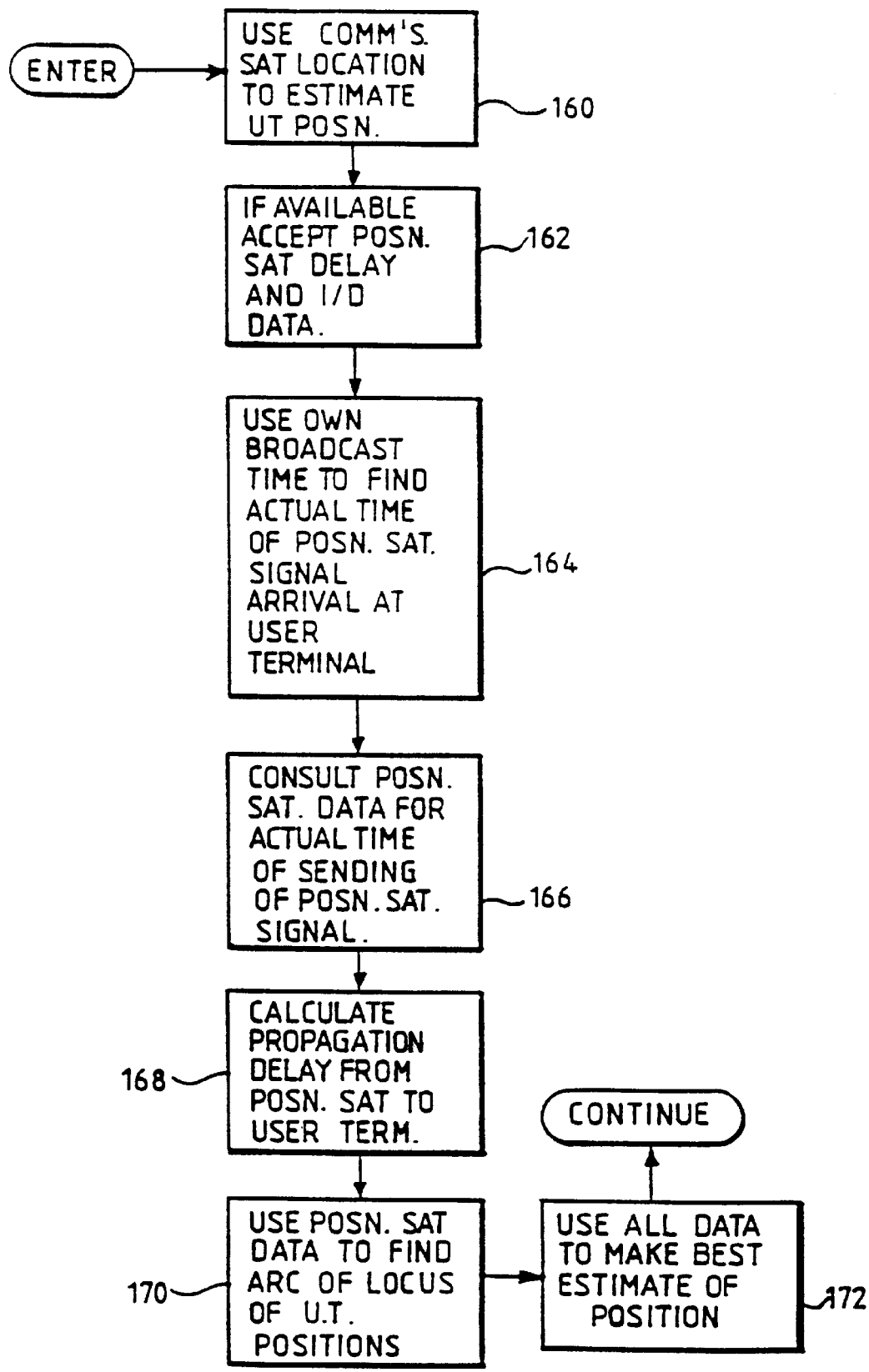
FIG. 20 is a flow chart of the overall activity of the earth station in relation to FIG. 19.

FIG. 20 is a flow chart of the activity of the earth station 38 and its associated controller 56 in response to the various activities of the terminal 44 shown in FIG. 19.

Entry is to a twenty-third activity 160 where the earth station 38 co-operates, as otherwise illustrated with reference to FIGS. 15 and 16, to establish, using the communications satellite 10 alone, an approximate estimation of the position of the terminal 44 on the surface of the earth 14.

Having thus approximately established the position of the terminal 44 on the surface of the earth, control passes to a twenty-fourth activity 162 where the earth station 38 and its associated controller 56 receive, if they are available, any messages from the terminal 44 indicating the identity of any navigational satellite 142 which may have sent a signal to the terminal 144 and the delay between the receipt, by the terminal 44, of the broadcast from the earth station 38 and the time when the terminal 44 receives the signal from the navigational satellite 142. If no navigational satellite 142 was ever visible to the terminal 44, then, of course, the twenty-fourth activity 162 has nothing to do. However, the twenty-fourth activity 162 will note the delays and identities any and all of the navigational satellites 142 from which the terminal 44 may have received signals.

Control then passes to a twenty-fifth activity 164 where the earth station 38 and its associated control of 56 calculate the actual time of arrival of the signal from each audible position satellite 142 at the terminal 44.

As earlier described, the earth station 38, using its own very accurate clock, is aware of the instant at which it sent the broadcast, via the communications satellite and, to the terminal 44. Again, as earlier described, the earth station 38 and its associated control of 56 have already measured the propagation delay between the earth station 38 and the terminal 44 via the satellite 10. The instant of arrival of the broadcast message, from the earth station 38, at the terminal 44, is thus accurately known at the earth station 38. The earth station 38 and the associated control of 56 merely have to add the measured delay by the terminal 44 to the calculated actual instant of arrival of the broadcast from the earth station 38 in order to establish the exact instant when the signal from a navigational satellite 142 reached the terminal 44.

Having made the calculation for each signal from a navigational satellite 142, control passes to a twenty-sixth activity 166. The earth station 38 and its associated controller 56 have available the parameters of the constellation of the navigational satellite 142. This includes information concerning the exact position of each navigational satellite 142 at any instant, and the instant at which a particular navigational satellite 142 will have sent its signal. This is derived either from an internal reference in the control of 56, by active on-line information from a control centre for the navigational satellites 142, or, as shown in FIG. 18, by interpreting signals from the navigational satellites 142 by direct reception. That is to say, the earth station 38 and its controller 56 can directly interact with the navigational satellites 142 to monitor their positions and times of sending of any signals, for comparison with the results from the terminal 44. It does not matter in which manner this information was obtained. It is simply sufficient that the information is available.

Having determined, from the identity of each satellite, the necessary physical parameters for the constellation of navigational satellites 142, control passes to a twenty-seventh activity 168 where the propagation delay from each position satellite 142 to the terminal 44 is calculated. Thereafter a twenty-eighth activity 170 uses knowledge of the actual positions of the navigational satellites 142 at the instant of their sending their original signals to the terminals 44, and of the calculated propagation delay between each one and the terminal 44, to calculate the loci and their intersections whereat the terminal 44 can be situated.

Control then passes to a twenty-ninth activity 172 where a best estimate of the position of the terminal 44 on the surface of the earth 14 is made based on the available measurements. For example, if only one communication satellite 10 was visible and no navigational satellites 142, the combination of Doppler shift measurement and propagation delay measurement to the terminal 44 for a single communications satellite is accepted, but with a very low confidence level. If two communications satellite's 10 10' were visible, but no navigational satellites 142, the combination of delay measurements is used to estimate the position of the terminal 44 on the surface of the earth 14 but with a low confidence level. If either two communications satellite 10 and one navigational satellite 142 were simultaneously accessible, or only one communication satellite 10 and one navigational satellite 142 were simultaneously visible, the estimated position of the terminal 144 on the surface of the earth 14, as calculated, is given a medium confidence level.

If two or more navigational satellites 142 were accessible, either their position estimations of the terminal 44 on the surface of the earth 14 are taken with more weighting, and reducing the weighting of the position estimations from the communications satellite or satellites 10 and their positional information, with a high degree of confidence or both the communications satellite 10 and the navigational satellites 142 are considered to achieve the final result with a high degree of confidence.

While FIGS. 19 and 20 show various activities occurring in sequence, it is to be appreciated that information, regarding the position satellites 142, can be gathered before, during and after execution of the sixteenth activity 146 and the twenty-third activity 160. Equally, further information from as yet unheard navigational satellites 142 can be added at any time to improve the position estimation for the terminal 44. Likewise, the terminal 44 can store results, gained from receiving signals from navigational satellites 142 before the earth station 38 interrogated the terminal 44 for service, thereby making for a very rapid and accurate determination of positions.

The terminal 44, in the example of the present invention here given, must be capable of receiving signals from navigational satellites 142 and from the communication satellites 10 even if they are on different frequencies. In the example given, the navigational satellites 142 send their signals on approximately 1600 MHz, as against the interaction frequencies with the communications satellite 10 at around 2000 MHz. If the present invention is practised using signals from an alternative constellation of communications satellites (such as those from another service provider), it is possible for the signals all to be at or near 2000 MHz. If a fixed terrestrial time source such as the low frequency radio station 143 is used, an LF receiver must be incorporated in the terminal 44.

In the example given above, the estimation of the position of the terminal 44 has been made employing just one delay measurement from each navigational satellite 142. It is to be appreciated that the present invention also encompasses the position of the terminal 44 being estimated on the basis of plural measurements from each navigational satellite 142.

Further, in the event that the source 142 143 of the signals also provides indication of the instant at which it sent the signal, which was received by the terminal 44, was sent by the source 142 143, the present invention also encompasses the terminal 44 detecting the indication of the instant of transmission and passing on that indication to the earth station 38 56 for use thereby. Such information is of greatest utility when the source is the terrestrial radio station 143, whose position is always fixed and whose regular transmissions merely need a time stamp.

As an additional feature, in the event that the earth station 38 56 can establish the position of the terminal with a high degree of certainty, the earth station 38 56 can pass an indication of the measured position of the terminal 44, to the terminal 44, using either a message to be displayed by the terminal 44 or by a synthesised audio message, so that the terminal 44 becomes useable as a position location device despite not having the inherent capacity so to do.

Notwithstanding the activities, apparatus and method hereinbefore described, the description now passes to the invention as claimed, in the operation of which the description hereinbefore provided constitutes, in whole or in part, a vital, exemplary operational element.

Figure 21:
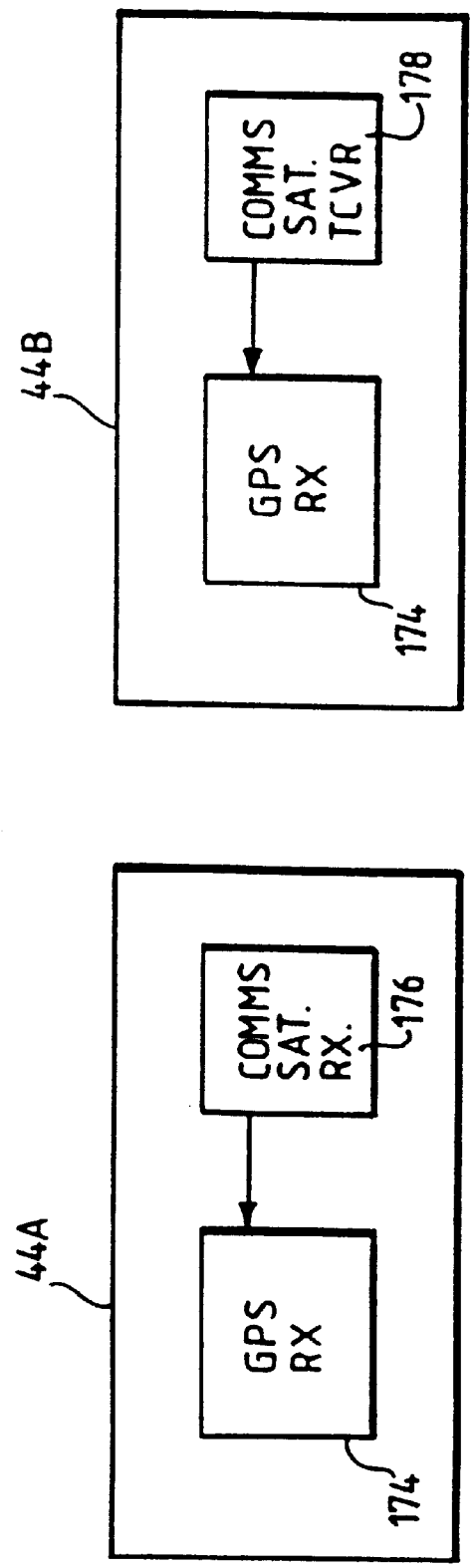
FIG. 21 is a block diagram of the elements in different terminals which can be employed in and as the present invention.

FIG. 21 shows block diagrams of two generic types of terminal which are applicable to the embodiment of the present invention.

A first style of terminal 44A comprises a GPS receiver 174 and a communications satellite receiver 176. The GPS receiver can be replaced by a receiver capable of interacting with any other satellite navigation receiver. The GPS receiver 174 receives signals from navigational satellites 142 and analyses those signals to determine the exact position of the terminal 44 44A 44B on the surface of the earth 14. The first style of terminal also comprises a communications satellite receiver 176 which is operative to receive radio signals from the communications satellites 10 and to interpret the signals therefrom. The satellite communications receiver 176 passes instructions to the navigational satellite receiver 174 to enable the navigational satellite receiver 174 better to acquire the necessary information from the navigational satellites 142.

In a second style of terminal 44B also comprises a navigational satellite receiver 176. Instead of the communications satellite receiver 176, however, it is provided with a communications satellite transceiver 178 which is capable of receiving messages from a communications satellite 10 and of sending messages to a communications satellite 10.

Within the scope of the embodiment of the invention, it envisaged that the first 44A and second 44B styles of terminal can be simple units, dedicated only to position determination. It is also envisaged that the elements of the terminals 44A 44B can be part of other apparatus, such as a user terminal as earlier described. Nonetheless, the two styles of terminal 44A 44B shown in FIG. 21 constitute the minimum for the practise of the invention as claimed.

Figure 22:
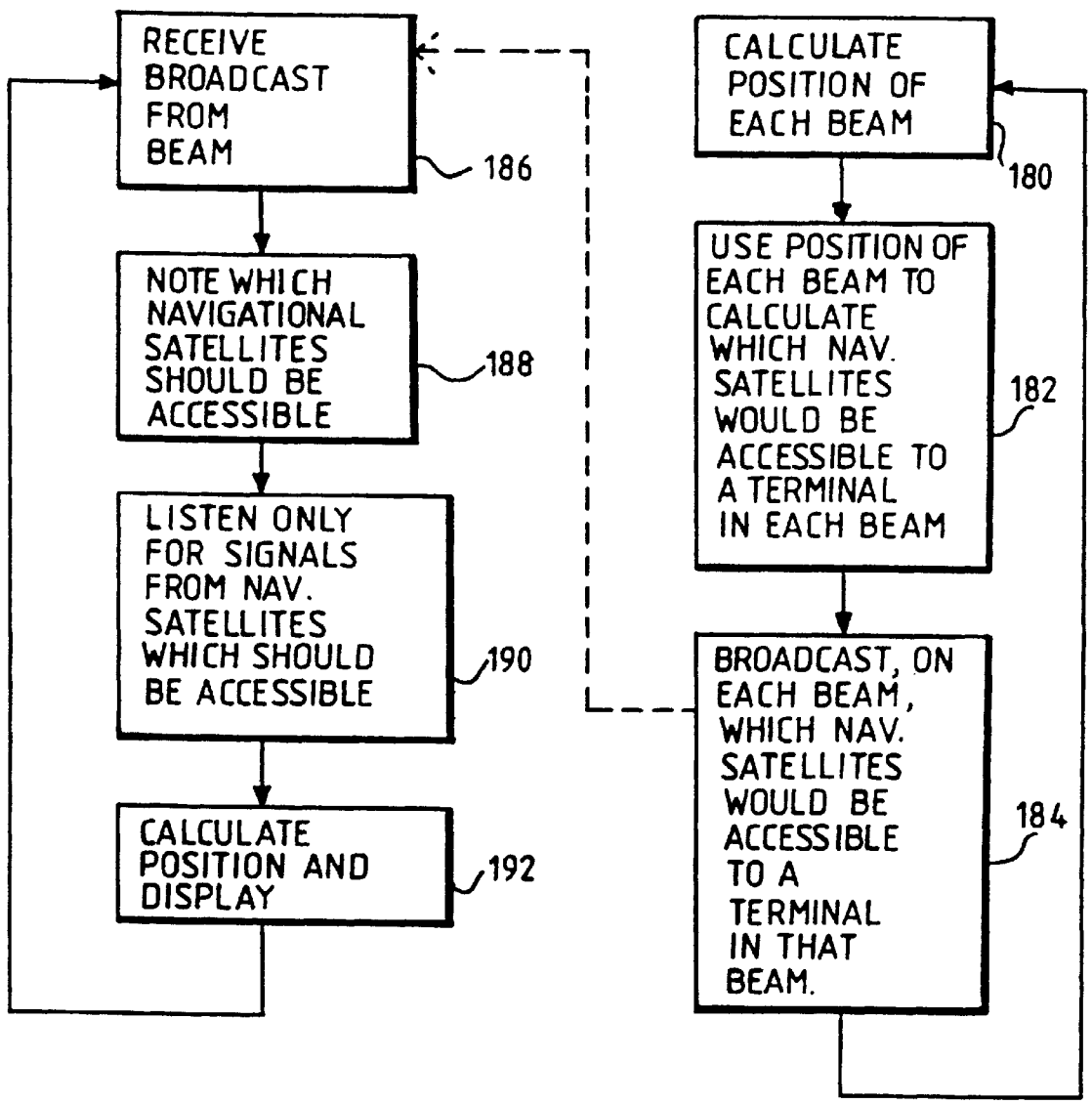
FIG. 22 is a combined flow chart of the activities of either of the terminals of FIG. 21, together with the corresponding activities of the communications system, when working out the position of either of the terminals.

FIG. 22 shows a combined flow chart of the activities of the communications satellite system 10 38 and of either the first style of terminal 44A or the second style of terminal 44B, when acquiring the necessary data from the navigational satellites 142. For the flow chart in FIG. 22, it is to be understood that the communications satellite transceiver 178 in the second style 44B of terminal functions in a receive-only mode.

In a thirtieth activity 180, the earth station 38, knowing the position of the communications satellite 10 and of each spot beam 30, calculates with which area on the earth 14 each spot beam 30 is interactive. Having made that calculation, the earth station 38 moves on to a thirty-first activity 182 where, using a knowledge of the orbits, time and positions of each of the navigational satellites 142 from which the terminal 44 44A 44B hopes to derive position fixing information, the earth station calculates which of the navigational satellites 142 would be appropriate (i.e. accessible) from the particular patch of the surface of the earth 14 covered by each spot beam 30.

Control then passes to a thirty-second activity 184 where the earth station 38 causes the communications satellite 10 to supply the indication of accessible satellites to the messages broadcast in each spot beam 30. The encoded information is sent out, from time to time, on a regular basis. Each terminal 44 44A 44B, in a spot beam 30, and receiving the communications satellite 10 broadcast. will be able to derive therefrom indication of which navigational satellites 142 are accessible.

Return of control to the thirtieth activity 180 ensures that the earth station 38 periodically updates its information so that the broadcasts from the communications satellite 10 are always correct.

The act of broadcast in a spot beam 30, indicated by broken line, transfers control to a thirty-third activity 186 where the communications satellite receiver 176 receives the broadcast from the communications satellite 10. Control then passes to a thirty-fourth activity 188 where the communications satellite receiver 176 decodes, from the broadcast, the identities of the navigational satellites 142 which can be heard. The communications satellite receiver 176 then indicates these identities to the navigational satellite receiver 174. In a thirty-fifth activity 190 the navigational satellite receiver 174 receives the indication of accessible navigational satellites 142 from the communications satellite receiver 176 and responds thereto by limiting its attempted listening for navigational satellites 142 to those indicated. Thus, the navigational satellite receiver 174 avoids the need to listen for a long time before it can determine its position. Having received enough signals from navigational satellites 142, the navigational satellite receiver 174, in a thirty-sixth activity 190, calculates the position of the terminal 44 44A 44B and displays it to the user. The indication can be either on a visual display, such as a liquid crystal display screen, or audible, such as synthesised speech, or both. In addition, the indication can be provided in the form of digital data for use in another system such as a computer, or a control system, or a navigational system, or the like.

Return of control to the thirty-third activity 186 ensures that the terminal 44 44A 44B periodically updates itself.

The approach used in the activities of FIG. 22 is preferred for military purposes since the necessary speed-up of the positioning satellite receiver 174 is achieved without the necessity for transmission by the terminal 44 44A 44B of any kind.

In addition to indication of the appropriate navigational satellites 142, the communications satellite 10 can also broadcast indication of the position, on the surface of the earth, of each spot beam 30, so that the terminal 44 44A 44B, even if access to the navigational satellites 142 fails, can have an approximate idea of its position and can display it, if required, this approximate indication being almost instantaneous.

Figure 23:
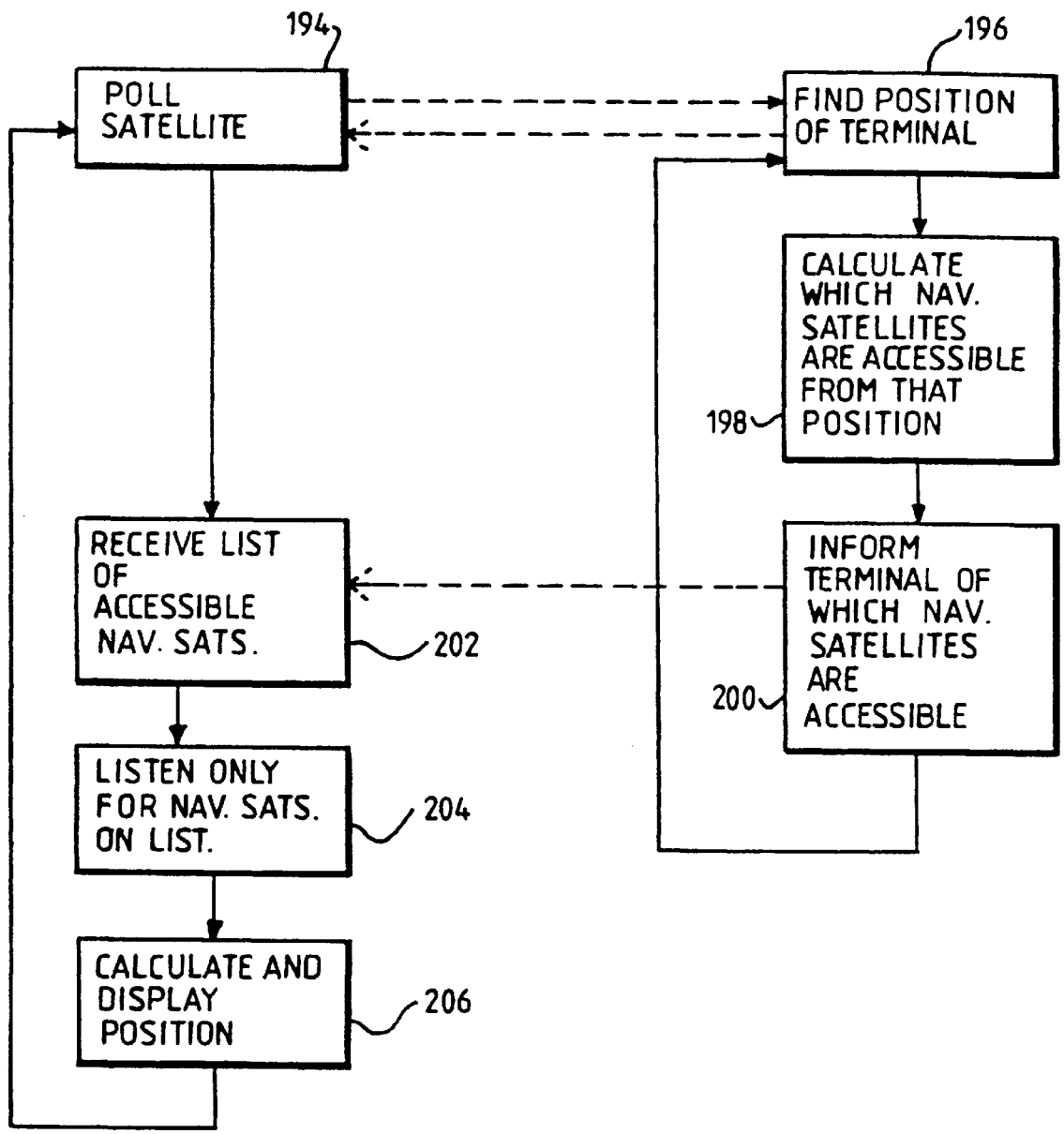
FIG. 23 is a flow chart of that terminal, shown in FIG. 21, which can communicate, when it interacts to determine the position of the terminal, together with the corresponding activities of the communications network.

Attention is now drawn to FIG. 23 which shows a flow chart of the activities of the communications satellite system 38 10 and of the terminal 44B when an alternative embodiment of the invention is provided. Since this embodiment requires the terminal 44B to send signals to the communications satellite 10, it is to be understood that only terminals of the second style 44B are suitable for this approach.

In a thirty-seventh activity 194 in the terminal 44B, and a thirty-eighth activity 196 in the earth station 38, the satellite system 10 38 and the terminal 44B co-operate according to any or all of the methods described with reference to FIGS. 1 to 20, by exchanging messages using the communications satellite transceiver 178, to measure the position of the terminal 44B on the surface of the earth 14 to the accuracy permitted using the communications satellite 10 or plural communications satellites 10. The earth station 38 uses the information gained to calculate the position of the terminal 44B and then, in a thirty-ninth activity 198, using a knowledge of the time, and the orbits and positions of each of the navigational satellites 142, calculates, for that terminal 44B alone, the best accessible navigational satellites 142. In a fortieth activity 200, the earth station 38 causes the communications satellite 10 to transmit to the terminal 44B indication of for which navigational satellites 142 the navigational satellite receiver 174 should listen. The message is decoded by the receiving portion of the communications satellite transceiver 178 in a forty-first activity and passed to the navigational satellite receiver 174 which, in a forty-second activity 204 responds by listening only for the indicated navigational satellites 142, thus improving the time required to receive sufficient data from the navigational satellites 142 for a precise measurement of the position of the terminal 44B to be made. Once there is sufficient data, in a forty-third activity 206 the navigational satellite receiver 174 calculates the position of the terminal 44B and causes its display in any of the ways indicated in the description of FIG. 22. In addition, the fortieth activity 200 can equally well inform the terminal 44B of the estimated position using the communications satellite 10 or satellites 10 in the thirty-eighth activity 196, which the terminal 44B, if required, can display to give a near instantaneous approximation to the position of the terminal 44B.

What is claimed is:

1. A navigational satellite positioning system wherein a terminal is operable to receive time and orbit information from a plurality of navigational satellites to calculate the position of the terminal, said system including a communications network, operable to inform said terminal which of said plurality of navigational satellites are within range of said terminal, said terminal, in response thereto, listening only for those of said plurality of navigational satellites that are within range.

2. A navigational satellite positioning system wherein a terminal is operable to receive time and orbit information from a plurality of navigational satellites to calculate the position of the terminal, said system including a communications network, operable to inform said terminal which of said plurality of navigational satellites are within range of said terminal, said terminal, in response thereto, listening only for those of said plurality of navigational satellites that are within range, wherein said terminal is operable to exchange messages with said communications network to establish an approximate position for said terminal, wherein said communications network, in response to a knowledge of said approximate position, is operative to calculate which of said plurality of navigational satellites are within range of said terminal, and wherein said communications network is operative to inform said terminal which of said plurality of navigational satellites are within range of said terminal.

3. A system, according to claim 1 wherein said communications network provides an array of abutting radio beams, and wherein said communications network is operative periodically to broadcast, in each beam, information concerning which of said plurality of navigational satellites would be within range of a terminal in that beam.

4. A system according to claim 1 wherein said communications network is operable to calculate the approximate Doppler frequency shift for each of said plurality of navigational satellites that are within range, wherein said communications network is operative to inform said terminal of said approximate Doppler shift for each of said plurality of navigational satellites that is within range, and wherein said terminal, in response thereto, is operative to adjust its frequency of reception to accommodate said approximate Doppler shift for each of said plurality of navigational satellites that is within range.

5. A system, according to claim 2, wherein said communications network comprises one or more communications satellites, wherein said terminal is operable to transmit to said one or more communications satellites and wherein each of said one or more communications satellites is operative to transmit to said terminal, each of said one or more communications satellites being operative to send and receive signals from an earth station, said earth station being operative to exchange signals with said terminal through said communications satellites and thereafter, being operative to analyse said signals to determine the position of said terminal on the surface of the earth.

6. A system according to claim 5 wherein, when said one or more communications satellites comprises just one communications satellite, said exchanged messages between said terminal and said earth station are adapted to measure the Doppler shift due to motion of said one communications satellite relative to said terminal and to measure the radio propagation delay between said communications satellite and said terminal.

7. A system according to claim 6 wherein said communications satellite is operative to communicate with said terminal using one out of a plurality of beams, each of said plurality of beams being interactive with a respective one out of a plurality of areas on the surface of the earth, ambiguity of position of said terminal being resolved by observation of with which out of said plurality of beams said terminal exchanges said signals.

8. A system according to claim 5 wherein, when said one or more communications satellites comprises more than one communications satellite, said exchanged signals between said earth station and said terminal are adapted to measure the propagation delay between each of said more than one communications satellites and said terminal.

9. A system according to claim 8 wherein each of said one or more communications satellites is each operative to provide a broadcast messages at predetermined times, said terminal is operative to measure and recording the time of arrival of each broadcast message, said terminal is operative to report back to said earth station said time of arrival of each received broadcast message, said earth station is operative to compare the reported time of arrival of said each broadcast message with said predetermined times to calculate the propagation delay between said terminal and each of said one or more communications satellites, and said earth station is operative to calculate the position of said terminal, relative to each of said one or more communications satellites, based on a knowledge of the actual position of each of said one or more communications satellites at said predetermined times.

10. A system according to claim 8 wherein said earth station is operative to send out a message, via each of said more than one communications satellite, and where said terminal is operative to return a message within a predetermined time of receipt of said message via each of said more than one communications satellite, said earth station being operative thereby to calculate the propagation delay between said more than one communications satellites and said terminal.

11. A system according to claim 10 wherein said earth station is operative to send said message via said each of said more than one communications satellites an optimum number of times, dependently upon the estimated position of said terminal with respect to said each of said more than one communications satellites, and to take the average of the propagation delays derived therefrom.

12. A system according to claim 8 wherein said terminal is operative to detect and record the time of arrival of broadcast messages from communications satellites which are no longer in sight and to report said previous broadcast messages to said earth station, said earth station using knowledge of the position of said communications satellites, no longer in sight, at the time of receipt of the broadcast message by said terminal to assist in the calculation of the position of said terminal.

13. A system according to claim 8 wherein said terminal is operative to detect and record the time of arrival of broadcast messages from navigational satellites which are no longer in sight and to report said previous broadcast messages from said navigational satellites to said earth station, said earth station using knowledge of the position of said navigational satellites, no longer in sight, at the time of receipt of the broadcast message from said navigational satellites by said terminal to assist in the calculation of the position of said terminal.

14. A system according to claim 8 wherein said terminal is operative to note the apparent recorded time, reported by said terminal, between two know intervals and is operative thereby to correct for drift and offset error in the timer in said terminal.

15. A system according to claim 6 wherein said earth station is operative to exchange said messages with said terminal a first optimum number of times to establish, by averaging, said Doppler shift and a second optimum number of times to establish, by averaging, said propagation delay, said first and second optimum number of times being dependent upon the estimated position of said terminal.

16. A system according to claim 5 wherein said communications satellite is operative to send, to said earth station, a signal on a first generated frequency, and wherein earth station is operative to send a signal at a first known frequency to said communications satellite and wherein said communications satellite is operative to use an internal oscillator to transpose said signal of a first known frequency and return the transposed signal to said earth station on a first transposed frequency, said earth station being operative to measure said first generated frequency and said first transposed frequency and to derive therefrom the Doppler shift between said earth station and said communications satellite and the error in the internal oscillator in said communications satellite.

17. A system according to claim 16 wherein said earth station is operative, after having derived said Doppler shift and said error in said internal oscillator in said communications satellite, to cause said communications satellite to send a signal at a second known frequency to said terminal, and wherein said terminal is operative to use an internal oscillator to transpose said signal of a second known frequency and return the transposed signal to said earth station, through said communications satellite, on a second transposed frequency, and wherein said terminal is operative to send, to said earth station, via said communications satellite, a signal on a second generated frequency, said earth station being operative to measure said second transposed frequency and said second generated frequency, and operative to derive therefrom the Doppler shift between said communications satellite and said terminal and to derive the error in the internal oscillator in said terminal.

18. A system, according to claim 5 wherein said earth station is operative to calculate the approximate Doppler frequency shift for each of said plurality of navigational satellites that are within range, wherein said earth station, via said communications satellite, is operative to inform said terminal of said approximate Doppler shift for each of said plurality of navigational satellites that is within range, and wherein said terminal, in response thereto, is operative to adjust its frequency of reception to accommodate said approximate Doppler shift for each of said plurality of navigational satellites that is within range.

19. A system according to claim 1 wherein said communications network comprises a terrestrial radio telephone network.

20. A system according to claim 2 wherein said communications network is operative to inform said terminal of said established approximate position for said terminal and, in response thereto, said terminal is operative to provide a user interpretable indication of said established approximate position.

21. A system according to claim 20 wherein said user interpretable indication includes use of a visual display.

22. A system, according to claim 2 wherein said terminal is operative to receive a signal, sent from a known position at a known time from a known navigational satellite; said terminal is operative to note the time of arrival of said signal; said terminal is operative to communicate said time of arrival to said earth station; said earth station is operative to calculate the distance between said known navigational satellite and said terminal; and said earth station is operative to incorporate said calculated distance in the estimation of said position of said terminal.

23. A system according to claim 22 wherein said known navigational satellite, in said signal, is operable to provide indication of its identity, wherein said terminal is operative to detect said identity, and wherein said terminal is operative to convey, to said earth station, indication of said identity.

24. A system, according to claim 22 wherein said navigational satellite is operative, in said signal, to provide indication of the time of origin of said signal from said navigational satellite, and wherein said terminal is operative to convey, to said earth station, indication of said time of origin of said signal from said known navigational satellite.

25. A system according to claim 22 wherein said navigational satellite is a satellite in a constellation other than that occupied by said communications satellite.

26. A system according to claim 25 wherein said navigational satellite is one of a constellation comprising a plurality of navigational satellites.

27. A system according to claim 26 wherein said terminal is operative to respond to any of said plurality of navigational satellites from which a signal can be received and wherein said earth station is operative to respond to information, received from said terminal, concerning any of said plurality of navigational satellites from which a signal can be received by said terminal.

28. A system according to claim 22 wherein said terminal is operative to commence a timing operation on receipt of a message from said earth station, wherein said terminal is operative to terminate said timing operation on receipt of a signal from said navigational satellite, wherein said terminal is operative to employ the measured, elapsed time of said timing operation as said time of arrival of said signal at said terminal, and wherein said earth station is operative to use the propagation delay between said earth station and said terminal to deduce the true time of arrival of said signal at said terminal.

29. A method for use in a navigational satellite positioning system wherein a terminal is operative to receive time and orbit information from a plurality of navigational satellites to calculate the position of the terminal, said method including the steps of:

including said terminal in a communications network;

employing said communications network to inform said terminal which of said plurality of navigational satellites are within range of said terminal, and in response thereto, listening with said terminal, only for those of said plurality of navigational satellites that are within range.

30. A terminal for use in a navigational satellite positioning system wherein said terminal is operative to receive time and orbit information from a plurality of navigational satellites to calculate the position of said terminal, wherein the terminal is operable in a communications network that informs said terminal which of said plurality of navigational satellites are within range of said terminal, and said terminal, in response thereto, being operative to listen only for those of said plurality of navigational satellites that are within range.

31. A terminal according to claim 30 operable to exchange messages with said communications network to establish an approximate position for said terminal, said communications network, in response to a knowledge of said approximate position, is operative to calculate which of said plurality of navigational satellites are within range of said terminal, said communications network being operative to inform said terminal which of said plurality of navigational satellites are within range of said terminal.

32. A terminal according to claim 30 for use in a system wherein said communications network provides an array of abutting radio beams, and wherein said communications network is operative periodically to broadcast, in each beam, information concerning which of said plurality of navigational satellites would be within range of a terminal in that beam.

33. A terminal according to claim 30 for use in a system wherein said communications network is operative to calculate the approximate Doppler frequency shift for each of said plurality of navigational satellites that are within range, and wherein said communications network is operative to inform said terminal of said approximate Doppler shift for each of said plurality of navigational satellites that is within range, said terminal, in response thereto, being operative to adjust its frequency of reception to accommodate said approximate Doppler shift for each of said plurality of navigational satellites that is within range.

34. A node for a communication network for use with a navigational satellite positioning system wherein the node is configured to calculate the position of a terminal and to receive time and orbit information for a plurality of navigational satellites, in which the node is configured to send time and orbit information for a plurality of navigational satellites that have been determined to be within range of the user terminal, to permit the terminal to determine its position with reference to the satellites.

35. A node according to claim 34 wherein the node comprises an earth station.

36. A navigational satellite positioning system wherein a terminal is operable to receive time and orbit information from a plurality of navigational satellites and to calculate the position of the terminal, and wherein the terminal is configured to communicate with a communications network, the system characterized in that the communications network is operable to exchange messages with the user terminal to calculate an approximate position of the terminal and to inform the terminal which of the said plurality of navigational satellites are within range of the terminal, and characterized by the terminal, in response thereto, listening only for those of the plurality of navigational satellite that are within range.

* * * * *